(12) United States Patent
Ueda et al.

(10) Patent No.: US 7,978,127 B2
(45) Date of Patent: Jul. 12, 2011

(54) MOBILE UNIT POSITIONING DEVICE

(75) Inventors: Akihiro Ueda, Toyota (JP); Iwao Maeda, Nagoya (JP); Kiyomi Nagamiya, Nissin (JP); Yasuhiro Tajima, Toyota (JP); Naoto Hasegawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 286 days.

(21) Appl. No.: 12/444,161

(22) PCT Filed: Feb. 19, 2008

(86) PCT No.: PCT/JP2008/053134
§ 371 (c)(1),
(2), (4) Date: Apr. 3, 2009

(87) PCT Pub. No.: WO2008/108194
PCT Pub. Date: Sep. 12, 2008

(65) Prior Publication Data
US 2010/0026566 A1 Feb. 4, 2010

(30) Foreign Application Priority Data

Feb. 26, 2007 (JP) ................. 2007-045882
Mar. 30, 2007 (JP) ................. 2007-094610

(51) Int. Cl.
*G01S 19/40* (2010.01)
(52) U.S. Cl. ................................... 342/357.23
(58) Field of Classification Search ............. 342/357.23, 342/357.24, 357.25
See application file for complete search history.

(56) References Cited

U.S. PATENT DOCUMENTS

| 5,883,595 | A | 3/1999 | Colley |
| 6,151,551 | A | 11/2000 | Geier et al. |
| 6,650,282 | B2 * | 11/2003 | Martikka ................. 342/357.23 |
| 7,443,338 | B2 * | 10/2008 | Wakamatsu et al. ..... 342/357.23 |
| 2005/0192024 | A1 | 9/2005 | Sheynblat |

FOREIGN PATENT DOCUMENTS

| JP | 3-108681 | 5/1991 |
| JP | 6-3432 | 1/1994 |
| JP | 7-306253 | 11/1995 |
| JP | 10 111137 | 4/1998 |
| JP | 11-118903 | 4/1999 |
| JP | 2963912 | 10/1999 |
| JP | 2002-40126 | 2/2002 |
| JP | 2003-279637 | 10/2003 |
| JP | 2005-17198 | 1/2005 |
| JP | 2006-504110 | 2/2006 |
| JP | 2006 322846 | 11/2006 |
| JP | 2007-51951 | 3/2007 |
| WO | 97 36187 | 10/1997 |
| WO | 98 39722 | 9/1998 |
| WO | 2004 036240 | 4/2004 |

* cited by examiner

*Primary Examiner* — Gregory C Issing
(74) *Attorney, Agent, or Firm* — Oblon, Spivak, McClelland, Maier & Neustadt, L.L.P.

(57) ABSTRACT

In a mobile-unit positioning device, phases of pseudo noise codes carried on satellite signals from satellites are observed at a mobile unit to measure a position of the mobile unit. A pseudo distance between one of the satellites and the mobile unit is measured for every satellite during a stop of the mobile unit using an observed value of the phase acquired during a stop of the mobile unit. An error index value indicating an error of the measured distance is computed based on the distances measured at points in time during a stop of the mobile unit. A weighting factor is determined based on the index value computed for every satellite. A weighted positioning computation using the determined weighting factor is performed to determine a position of the mobile unit during movement using an observed value of the phase acquired during movement.

10 Claims, 9 Drawing Sheets

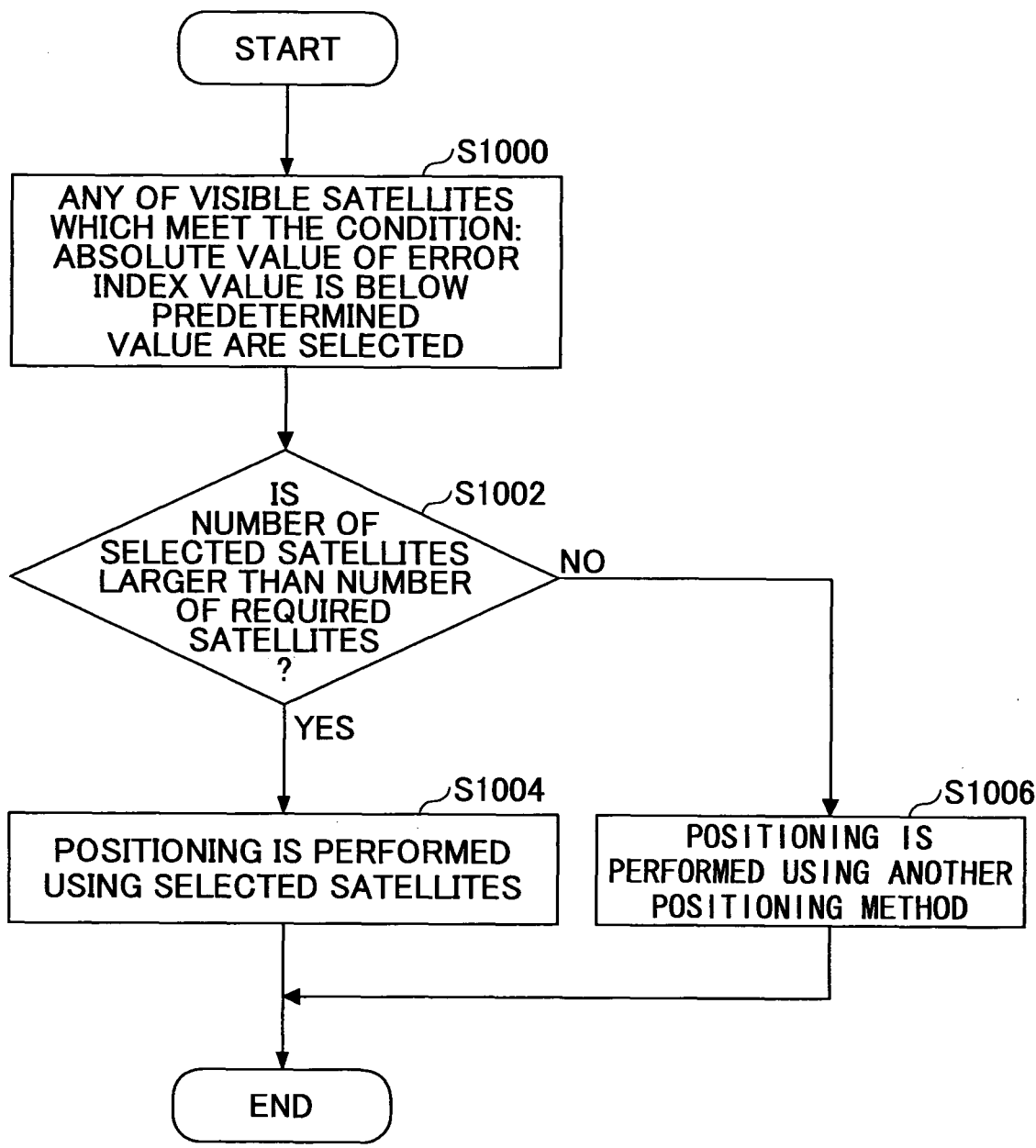

MOBILE UNIT POSITIONING DEVICE

TECHNICAL FIELD

This invention relates to a mobile-unit positioning device which measures a position of a mobile unit or the like.

BACKGROUND ART

Conventionally, there is known the method of computing a user speed on the geocentric orthogonal coordinate system and its time offset rate by simultaneous speed equations. The simultaneous speed equations are constructed using a user position on the geocentric orthogonal coordinate system determined by simultaneous position equations, and the time offset. The differentiated value of the speed on the geocentric orthogonal coordinate system with respect to time is determined by solving the simultaneous speed equations. Each value required by the user is computed by obtaining the differentiated value of the speed on the geocentric orthogonal coordinate system with respect to time through transforming of the geocentric orthogonal coordinate system into the geocentric orthogonal coordinate system at the user position. For example, refer to Japanese patent No. 2963912.

Generally, in GPS (global positioning system) positioning, measurement of a position of a mobile unit is performed based on the results of received signals from a plurality of satellites. At this time, the radio propagation paths from the respective satellites to the mobile unit are different from each other, and a different error for each satellite may be included in the measured value (for example, pseudo distance) obtained based on the received signals from the respective satellites. For this reason, when performing GPS positioning, there are cases in which a weight is assigned for each satellite.

Conventionally, in many cases, the weighting factors used in the above-mentioned weighting are determined in accordance with the residual difference at the previous instant of the positioning computation, the difference in the elevation angle of each satellite, or the difference in the intensity of the signal received from each satellite. However, there is a problem that using the determined weighting factors is not appropriate for reflecting a different error for every satellite.

DISCLOSURE OF THE INVENTION

According to one aspect of the invention, there is disclosed an improved mobile-unit positioning device in which the above-mentioned problem is eliminated.

According to one aspect of the invention, there is disclosed a mobile-unit positioning device which is capable of performing a weighted positioning computation which appropriately reflects a different error for every satellite.

In an embodiment of the invention which solves or reduces one or more of the above-mentioned problems, there is disclosed a mobile-unit positioning device in which phases of pseudo noise codes carried on satellite signals from a plurality of satellites are observed at a mobile unit to measure a position of the mobile unit, the mobile-unit positioning device comprising: a pseudo-distance measuring part measuring a pseudo distance for every satellite between one of the plurality of satellites and the mobile unit during a stop of the mobile unit using an observed value of the pseudo noise code phase acquired during a stop of the mobile unit; an error-index-value computing part computing an error index value for every satellite indicating an error of the measured pseudo distance, based on the pseudo distances measured by the pseudo-distance measuring part at a plurality of points in time during a stop of the mobile unit; a weighting-factor determining part determining a weighting factor for every satellite based on the error index value for every satellite computed by the error-index-value computing part; and a positioning computation part performing a weighted positioning computation using the weighting factor for every satellite determined by the weighting-factor determining part, to determine a position of the mobile unit during movement using an observed value of the pseudo noise code phase acquired during movement of the mobile unit.

The above-mentioned mobile-unit positioning device may be arranged so that the error index value is either a variance or a standard deviation.

The above-mentioned mobile-unit positioning device may be arranged to further comprise an error averaging part which computes an average of errors of measured pseudo distances for every satellite based on the pseudo distances measured by the pseudo-distance measuring part at a plurality of points in time during a stop of the mobile unit, so that the positioning computation part determines a position of the mobile unit during movement using the observed value of the phase which is corrected by the error average computed by the error averaging part.

In an embodiment of the invention which solves or reduces one or more of the above-mentioned problems, there is disclosed a mobile-unit positioning device in which Doppler frequencies of carriers of satellite signals from a plurality of satellites are observed at a mobile unit to measure a speed of the mobile unit, the mobile-unit positioning device comprising: a mobile-unit-speed computing part computing a speed of the mobile unit for every satellite during a stop of the mobile unit using an observed value of a Doppler frequency acquired during a stop of the mobile unit; an error-index-value computing part computing an error index value for every satellite indicating an error of the computed mobile unit speed, based on the mobile unit speeds computed by the mobile-unit-speed computing part at a plurality of points in time during a stop of the mobile unit; a weighting-factor determining part determining a weighting factor for every satellite based on the error index value for every satellite computed by the error-index-value computing part; and a positioning computation part performing a weighted positioning computation using the weighting-factor for every satellite determined by the weighting-factor determining part, to determine a speed of the mobile unit during movement using an observed value of the Doppler frequency acquired during movement of the mobile unit.

The above-mentioned mobile-unit positioning device may be arranged so that the error index value is either a variance or a standard deviation.

The above-mentioned mobile-unit positioning device may be arranged to further comprise a satellite selecting part which selects one of the plurality of satellites that is used for the weighted positioning computation, based on mobile unit speed for every satellite computed by the mobile-unit-speed computing part.

The above-mentioned mobile-unit positioning device may be arranged to further comprise a mobile-unit stop determining part which determines whether the mobile unit is in a stop state, based on an output signal of a sensor arranged in the mobile unit, so that the satellite selecting part selects one of the plurality of satellites used for the weighted positioning computation, in accordance with the error index value for every satellite computed by the error-index-value computing part.

The above-mentioned mobile-unit positioning device may be arranged so that the satellite selecting part preferentially selects a satellite having a small error index value computed by the error index value computing part.

The above-mentioned mobile-unit positioning device may be arranged so that the error index value is any of an average of the mobile unit speeds computed by the mobile-unit-speed computing part at a plurality of points in time during a stop of the mobile unit determined by the mobile-unit stop determining part, a variance of errors of the computed mobile unit speeds, a standard deviation of errors of the computed mobile unit speeds, a low pass value obtained from the computed mobile unit speeds applied to a low pass filter, and a rate of change of the low pass value solely or in combination thereof.

According to the embodiments of the invention, it is possible to provide a mobile-unit positioning device which performs a weighted positioning computation in which a different error for every satellite is reflected appropriately.

BRIEF DESCRIPTION OF THE DRAWINGS

FIG. 10 is a flowchart for explaining another positioning data processing (step S818) in the positioning processing of FIG. 8.

BEST MODE FOR CARRYING OUT THE INVENTION

A description will now be given of the embodiments of the invention with reference to the accompanying drawings.

Figure 1:
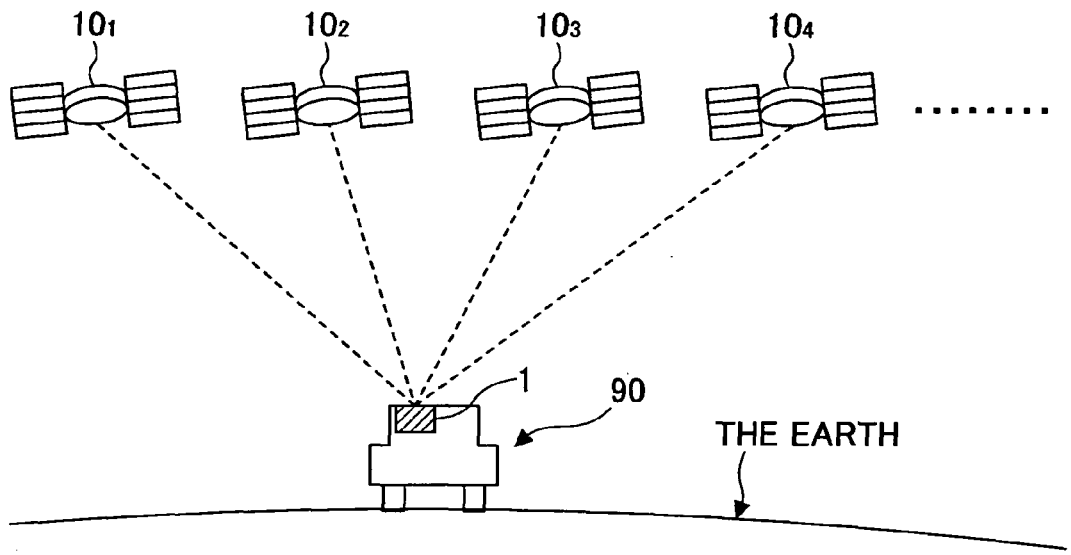
FIG. 1 is a diagram showing the overall composition of a GPS to which a mobile-unit positioning device in an embodiment of the invention is applied.

FIG. 1 is a diagram showing the overall composition of a GPS (Global Positioning System) to which a mobile-unit positioning device in an embodiment of the invention is applied.

As shown in FIG. 1, the GPS includes GPS satellites 10 which orbit around the earth, and an automotive vehicle 90 which is located on the earth and movable on the surface of the earth.

The vehicle 90 is an example of mobile unit. Other examples of mobile unit may include information terminals, such as a motorcycle, a railroad train, a vessel, an aircraft, a fork lift, a robot, and an information terminal, such as a cellular phone, which is movable with movement of its owner, etc.

Each GPS satellite 10 broadcasts a navigation message (satellite signal) to the earth invariably. The navigation message contains the satellite orbit information (ephemeris data or almanac data) of the corresponding GPS satellite 10, the correction value of its clock, and the correction coefficient of the ionized layer.

The navigation message is spread by C/A (coarse acquisition) code and carried on L1 wave (frequency: 1575.42 MHz), and it is broadcast to the earth invariably. L1 wave is a combined wave of a sine wave modulated by C/A code and a cosine wave modulated by P code (precision code), and it is subjected to quadrature modulation. The C/A code and the P code are pseudo noise codes which consist of code sequences in which −1 and 1 are randomly arrayed at intervals of a given period.

Currently, 24 GPS satellites 10 are orbiting around the earth at an altitude of about 20,000 km, and four GPS satellites 10 are equally arranged in each of six orbital planes around the earth the orbital inclination of which are about 55 degrees. Therefore, five or more of the GPS satellites 10 can always be observed at any place on the earth which is open to the sky.

Figure 2:
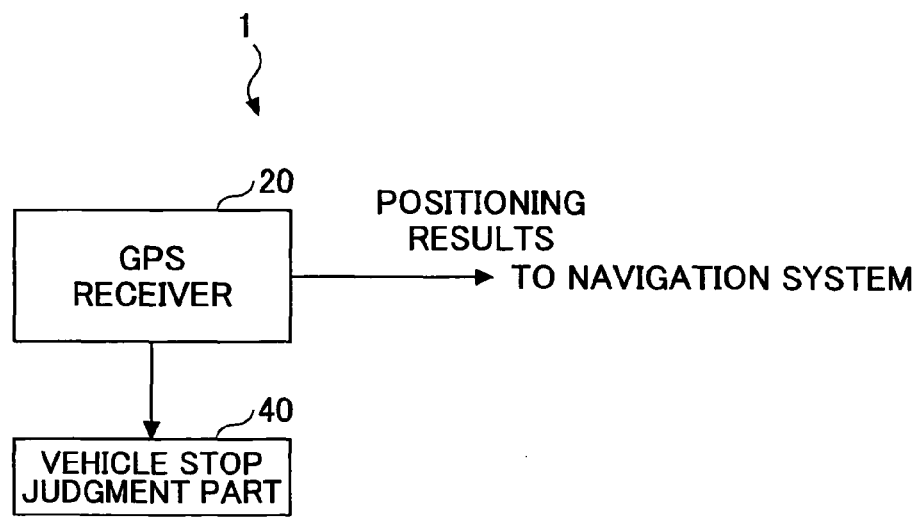
FIG. 2 is a block diagram showing the composition of an in-vehicle device.

As shown in FIG. 1, an in-vehicle device 1 which is a mobile-unit positioning device of the invention is arranged in the vehicle 90. FIG. 2 shows the composition of the in-vehicle device 1.

As shown in FIG. 2, the in-vehicle device 1 includes a GPS receiver 20 and a vehicle stop judgment part 40 as main components. The functions of the GPS receiver 20 will be described later.

The vehicle stop judgment part 40 determines whether the vehicle 90 is in a stop state. There are various methods of judging a vehicle stop, and any of these methods may be adopted arbitrary. For example, the vehicle stop judgment part 40 may determine whether the vehicle is in a stop state or not, based on an output signal (differential value, etc.) of an acceleration sensor or angular-velocity sensor arranged in the vehicle 90.

Alternatively, the vehicle stop judgment part 40 may determine whether the vehicle is in a stop state or not, based on an output signal of a wheel speed sensor arranged in the vehicle 90. Alternatively, the vehicle stop judgment part 40 may determine whether the vehicle is in a stop state or not, using an output signal of another in-vehicle sensor which can output a physical quantity related to a vehicle speed, such as a sensor which senses a rotational speed of the output axis of a transmission, detects an operating condition of a brake pedal, or detects a shift position, instead of, or in addition to, the output signal of the wheel speed sensor.

Figure 3:
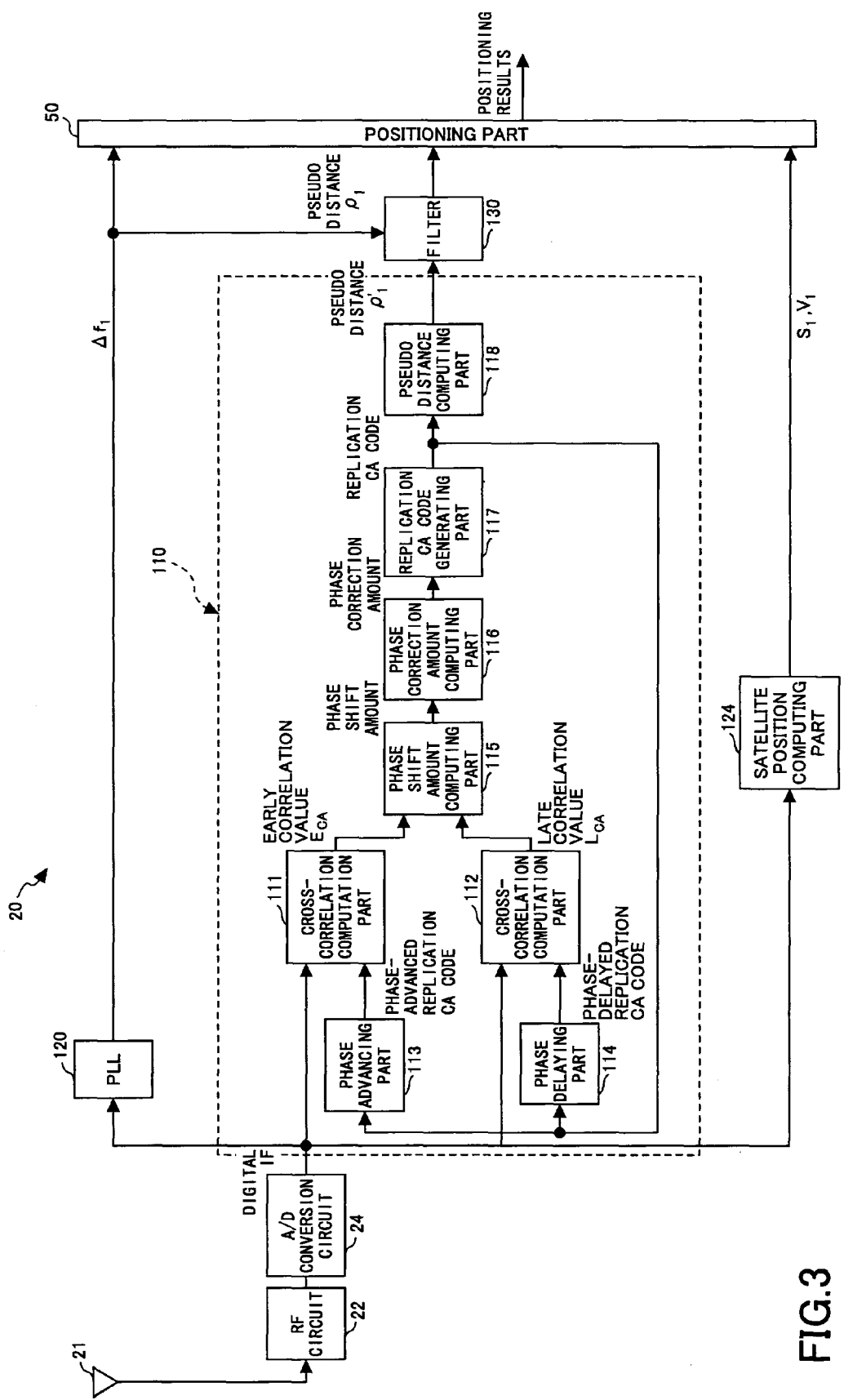
FIG. 3 is a diagram showing the internal composition of a GPS receiver.

FIG. 3 shows the internal composition of the GPS receiver 20.

In the following, a description will be given of signal processing (signal processing of one channel) of a satellite signal received from a certain GPS satellite $10_1$ from among the plurality of satellites, for the sake of convenience of description.

The signal processing is executed for every observation period (e.g., 1 ms) in parallel with respect to each of the satellite signals from the observable GPS satellites $10_1$, $10_2$, $10_3$.

The GPS receiver 20 includes a GPS antenna 21, an RF (radio frequency) circuit 22, an A/D (analog-to-digital) conversion circuit 24, a DDL (delay-locked loop) 110, a PLL (phase-locked loop) 120, a satellite position computing part 124, and a filter 130.

The DDL 110 includes cross-correlation computation parts 111,112, a phase advancing part 113, a phase delaying part 114, a phase shift amount computing part 115, a phase correction amount computing part 116, a replication C/A code generating part 117, a pseudo distance computing part 118, and a positioning part 50.

The GPS antenna 21 receives a satellite signal sent from GPS satellite 10$_1$, and converts the received satellite signal into a voltage signal (in this example, its frequency is about 1.5 GHz). This 1.5-GHz voltage signal is called RF (radio frequency) signal.

The RF circuit 22 amplifies a weak RF signal received via the GPS antenna 21 to the level that enables A/D conversion to be performed in the subsequent part, and converts the frequency of the RF signal into an intermediate frequency (typically, in a range of 1 MHz-20 MHz) which can carry out signal processing of the frequency of the RF signal. The signal acquired by the down conversion of the RF signal frequency is called IF (intermediate frequency) signal.

The A/D conversion circuit 24 converts the IF signal (analog signal) received from the RF circuit 22 into a digital IF signal that enables digital signal processing to be performed. This digital IF signal is supplied to the DDL 110, the PLL 120 and others.

The replication C/A code generating part 117 of the DDL 110 generates a replication C/A code. The replication C/A code has a code sequence of +1 and 1 which is the same as that of the C/A code carried on the satellite signal from GPS satellite 10$_1$.

The replication C/A code generated by the replication C/A code generating part 117 is supplied to the cross-correlation computation part 111 via the phase advancing part 113. Namely, an early replication code is supplied to the cross-correlation computation part 111. The phase of the supplied replication C/A code is advanced by a predetermined phase by the phase advancing part 113. Suppose that the amount of phase advance caused by the phase advancing part 113 is set to θ1.

The digital IF signal is multiplied by a replication carrier generated by the PLL 120, at a mixer (which is not illustrated), and the resulting signal is also supplied to the cross-correlation computation part 111.

The cross-correlation computation part 111 computes a correlation value (early correlation value ECA) using the inputted digital IF signal and the early replication code with the phase advance amount θ1. For example, the early correlation value ECA is computed by the following formula:

early correlation value $ECA = \Sigma\{(\text{digital } IF) \times (\text{early replication code})\}$ Moreover, the replication C/A code generated by the replication C/A code generating part 117 is supplied to the cross-correlation computation part 112 via the phase delaying part 114. Namely, a late replication code is supplied to the cross-correlation computation part 112. The phase of the replication C/A code is delayed by a predetermined phase by the phase delaying part 114. The amount of phase delay caused by the phase delaying part 114 is the same as θ1, but the sign of the phase delay amount is opposite to that of the phase advance amount.

Moreover, the digital IF signal is multiplied by the replication carrier generated by the PLL 120, at a mixer (which is not illustrated), and the resulting signal is also supplied to the cross-correlation computation part 112.

The cross-correlation computation part 112 computes a correlation value (late correlation value LCA) using the inputted digital IF signal and the late replication code with the phase delay amount θ1. For example, the late correlation value LCA is computed by the following formula:

late correlation value $LCA = \Sigma\{(\text{digital } IF) \times (\text{late replication code})\}$ In this manner, the cross-correlation computation parts 111 and 112 perform correlation value computation in which a correlator interval d1 (called "spacing") is set to 2θ1. The early correlation value ECA and the late correlation value LCA computed by the cross-correlation computation parts 111 and 112, respectively, are supplied to the phase shift amount computing part 115.

The phase shift amount computing part 115 computes a phase difference between the digital IF signal and the replication C/A code generated by the replication C/A code generating part 117. Namely, the phase shift amount computing part 115 computes (or estimates) a phase shift amount Δφ of the generated replication C/A code to the received C/A code. For example, the phase shift amount Δφ of the replication C/A code is computed by the following formula:

$$\Delta\phi = (ECA - LCA)/2(ECA + LCA)$$

The thus computed phase shift amount Δφ is supplied to the phase correction amount computing part 116.

The phase correction amount computing part 116 computes an appropriate phase correction amount for eliminating the phase shift amount Δφ. For example, an appropriate phase correction amount is computed by the following formula:

(phase correction amount) = ($P$ gain)×(phase shift amount Δφ) + ($I$ gain)×Σ(phase shift amount Δφ)

This formula represents the feedback control using PI control, and P gain and I gain are experimentally determined by taking into consideration the balance of variation and response, respectively. In this manner, the computed phase correction amount is supplied to the replication C/A code generating part 117.

The replication C/A code generating part 117 corrects the phase of the replication C/A code being generated by the phase correction amount computed by the phase correction amount computing part 116. Namely, the tracking point of the replication C/A code is corrected.

The thus generated replication C/A code is supplied to the cross-correlation computation parts 111 and 112 via the phase advancing part 113 and the phase delaying part 114, and the same is supplied to the pseudo distance computing part 118. In the cross-correlation computation parts 111 and 112, the thus generated replication C/A code is used for the correlation value computation of an IF digital signal inputted for a next observation period.

The pseudo distance computing part 118 computes a pseudo distance $\rho_1'$ based on the phase information of the replication C/A code generated by the replication C/A code generating part 117. For example, the pseudo distance $\rho_1'$ is computed by the following formula:

$$\rho_1' = N_1 \times 300$$

where "'" affixed to pseudo distance ρ indicates that the filtering of pseudo distance is not performed, the subscript "1" denotes a specific pseudo distance ρ computed based on the C/A code of GPS satellite 10$_1$, and "$N_1$" denotes the number of bits of the C/A code between GPS satellite 10$_1$ and vehicle 90. $N_1$ is computed based on the phase of the replication C/A code generated by the replication C/A code generating part 117 and the local clock provided in the GPS receiver 1. The numeric value "300" in the above formula is derived from the fact that a unit time equivalent to 1 bit is 1 microsecond and a length equivalent to the C/A code is about 300 m (1 microsecond×the velocity of light).

In this manner, the signal indicating the computed pseudo distance ρ'1 is supplied from the DDL 110 to the filter 130.

In the PLL 120, a Doppler frequency Δf1 of the received carrier which is subjected to Doppler shift is measured using the internally generated carrier replication signal. Namely, the PLL 120 measures the Doppler frequency Δf1 (=fr−fL1) based on a frequency fr of the replication carrier and the known carrier frequency fL1 (=1575.42 MHz). The digital IF signal, supplied to the PLL 120, is the digital IF signal multiplied by the replication C/A code from the DDL 110 by the mixer (which is not illustrated). The signal indicating the Doppler frequency Δf1 from the PLL 120 is supplied to the filter 130 and the positioning part 50.

In the filter 130, the filtering of pseudo distance $\rho_1'$ is performed using the Doppler frequency Δf1. For example, the pseudo distance $\rho_1$ after the filtering by the filter 130 is computed by the following equation.

$$\rho_1(i) = \frac{\rho_1'(i) + (M-1) \times \{\rho_1(i-1) + \int \Delta V \cdot dt\}}{M} \quad \text{Equation 1}$$

In the above equation, (i) denotes the current period, (i−1) denotes the previous period, and M denotes the weighting factor. The value of M is determined appropriately, taking into consideration the balance of precision and response. ΔV denotes the relative velocity between GPS satellite $10_1$ and vehicle 90 (Doppler speed). For example, ΔV is computed by means of the following formula:

$$\Delta fL1 = \Delta V \cdot fL1/(c - \Delta V)$$

where c denotes the velocity of light.

The filtering by the above equation 1 may be the so called carrier smoothing. The filtering is realized using either the above-described hatch filter or the Kalman filter. The signal indicating the pseudo distance $\rho_1$ from the filter 130 is supplied to the positioning part 50.

The satellite position computing part 124 computes a current position $S_1=(X_1, Y_1, Z_1)$ of GPS satellite $10_1$ on the world coordinate system and its moving speed $V_{1=(V_1, V_1, V_1)}$, based on the satellite orbit information of the navigation message. The satellite moving speed vector $V_1=(V_1, V_1, V_1)$ may be computed by dividing the difference between the current period value and the previous period value of the computed satellite position $S_1$ by the time duration of the computation period. In this manner, the satellite position $S_1$ and the satellite moving speed vector $V_1$ computed by the satellite position computing part 124 are supplied to the positioning part 50.

Figure 4:
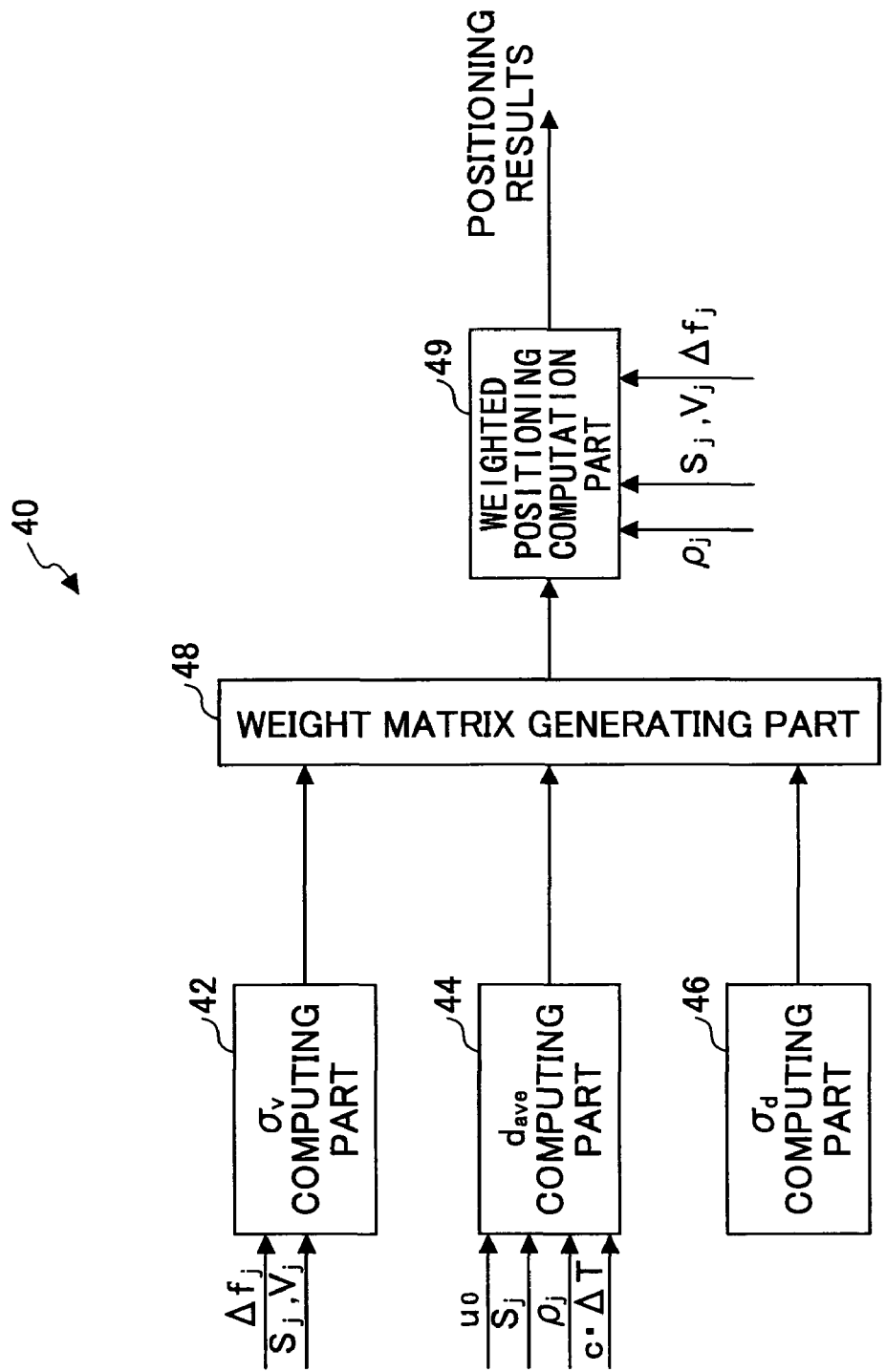
FIG. 4 is a block diagram showing the composition of a positioning part of this embodiment.

Next, the composition of the positioning part 50 of this embodiment will be explained. FIG. 4 shows the composition of the positioning part 50 of this embodiment.

As shown in FIG. 4, the positioning part 50 of this embodiment includes a σv computing part 42, a $d_{ave}$ computing part 44, a σd computing part 46, a weight matrix generation part 48, and a weighted positioning computation part 49. The respective functions of the parts 42, 44, 46, 48 and 49 will be explained with reference FIG. 5 and FIG. 6.

Figure 5:
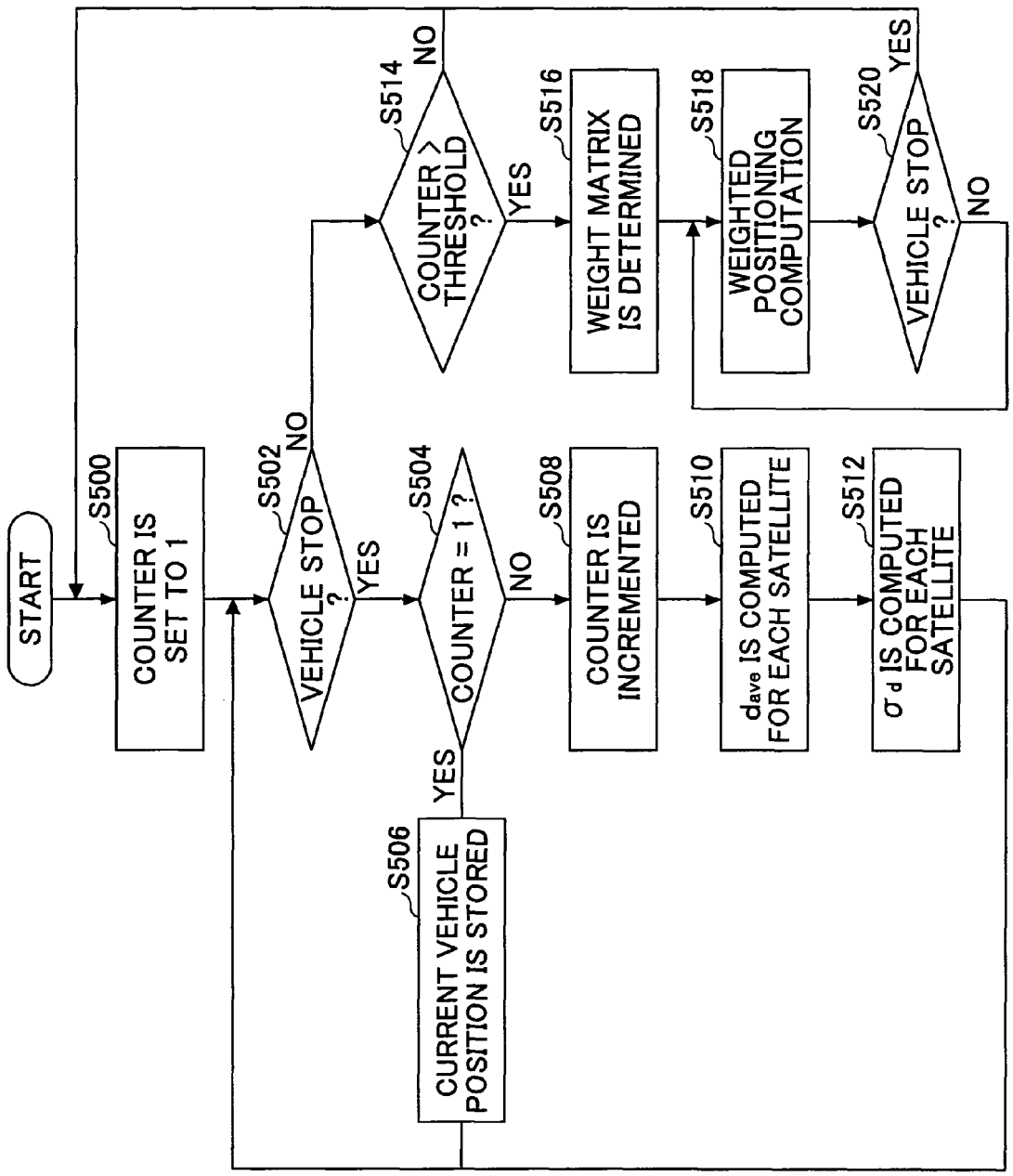
FIG. 5 is a flowchart for explaining a vehicle position positioning processing which is performed by the positioning part of this embodiment.

FIG. 5 is a flowchart for explaining a vehicle position positioning processing which is performed by the positioning part 50 of this embodiment.

Execution of the processing routine shown in FIG. 5 is repeated for every predetermined period during an active operation period from the instant an ignition switch of the vehicle 90 is turned ON to the instant the ignition switch is turned OFF. The predetermined period may be equivalent to the above-mentioned observation period.

At state S500, the counter is initialized. Namely, the value of the counter is set to 1.

At step S502, it is determined whether the vehicle 90 is currently in a stop state, based on the judgment result from the vehicle stop judgment part 40. When the vehicle 90 is in a stop state, the control progresses to step S504. Typically, this situation may be a situation prior to the vehicle 90 starts running after an engine start, or a situation in which the vehicle 90 stops temporarily in front of a traffic signal after a start of vehicle running.

On the other hand, when the vehicle 90 is moving, the control progresses to step S514.

At step S504, it is determined whether the current value of the counter is equal to 1. When the current value of the counter is equal to 1, the control progresses to step S506, otherwise (namely, when the current value of the counter is larger than 1), the control progresses to step S508.

At step S506, the position (Xu, Yu, Zu) of vehicle 90 based on the newest positioning results is stored as vehicle position u0=(Xu0, Yu0, Zu0) immediately after a vehicle stop. The vehicle position u0=(Xu0, Yu0, Zu0) immediately after a vehicle stop may be what is computed by the weighted positioning computation, or may be what is computed by another positioning method (for example, inertial navigation).

When using inertial navigation, it is preferred to use an inertial navigation in which the vehicle position corrected by matching the image recognition result of road signs using an in-vehicle camera with map data including the known position information of road signs is used as an initial position.

At step S508, the value of the counter is incremented by 1.

At step S510, the average $d_{ave\_}j$ of the errors of pseudo distance ρj (called "range error average $d_{ave\_}j$") of the GPS satellite 10j which can be currently observed is computed for every GPS satellite 10j by the $d_{ave}$ computing part 44. The subscript "j" denotes the satellite number (j=1, 2, 3, 4, . . . ) of GPS satellites 10 which can be currently observed, and it is a value specific to each GPS satellite 10.

It should be noted that the range error average $d_{ave\_}j$ is the average of the errors of pseudo distance ρj which are observed in a stop state of the vehicle. For example, the range error average $d_{ave\_}j$ is computed as follows.

$$d_{ave\_j} = \frac{1}{n} \cdot \sum_{i=1}^{n} d_j(i) \quad \text{Equation 2}$$

where n denotes the number of data items. In this example, n=(counter value). dj(i) denotes the error of pseudo distance ρj(i) detected for the i-th period, assuming that dj(1) denotes the error of pseudo distance ρj(i) detected for the first period after a vehicle stop is detected. For example, dj(i) is computed by the following equation, using the principle that the positioning results immediately after a vehicle stop have the highest accuracy of position.

$$d_j(i) = \sqrt{(X_j(i) - X_{u0})^2 + (Y_j(i) - Y_{u0})^2 + (Z_j(i) - Z_{u0})^2} + c \cdot \Delta T - \rho_j(i) \quad \text{Equation 3}$$

In the above equation, (Xj(i), Yj(i), Zj(i)) denotes the satellite position computed for the i-th period. The satellite position Sj computed by the satellite position computing part 124 for the period corresponding to the i-th period is used as (Xj(i), Yj(i), Zj(i)). (Xu0, Yu0, Zu0) denotes the vehicle position u0 immediately after a vehicle stop stored at the above step S506. Similarly, ρ j(i) denotes the pseudo distance ρj of GPS satellite 10$j$ computed for the i-th period. c·ΔT denotes the clock error in the GPS receiver 20. The value which is subsequently determined by the weighted positioning computation part 49 may be used as c·ΔT.

At step S512, the σd computing part 46 computes the standard deviation σd_j (called "range error standard deviation σd_j") of the errors of pseudo distance ρj computed with respect to the GPS satellites 10$j$ which can be currently observed for every GPS satellite 10$j$.

Similarly, it should be noted that the range error standard deviation σd_j is a standard deviation of the errors of pseudo distance ρj which are observed in a stop state of the vehicle. For example, the range error standard deviation σd_j is computed by the following formula:

$$\sigma d\_j^2 = \Sigma (dj(i) - d_{ave\_j})^2 / n$$

In the above formula, σd_j$^2$ denotes the variance of the errors dj of pseudo distance ρj. The range error standard deviation σd_j may be computed using the respective values dj(i) and $d_{ave\_}$j computed by the $d_{ave}$ computing part 44.

In this manner, while the vehicle 90 is in a stop state, the processing of step S508 and step S510 is repeated. Based on the data observed at any time when the vehicle 90 is in a stop state, the range error average $d_{ave\_}$j and the range error standard deviation σd_j are computed for every GPS satellite 10$j$ for every predetermined period.

It is a matter of course that as the periodicity i when the vehicle 90 is in a stop state increases, the number of samples increases, and the reliability of the range error average $d_{ave\_}$j and the range error standard deviation σd_j increases accordingly.

In this manner, the range error average $d_{ave\_}$j and the range error standard deviation σd_j which are computed while the vehicle 90 is in a stop state are used at the subsequent steps S514-S518 effectively in the positioning of the position of the vehicle 90 after the vehicle 90 starts moving after the vehicle stop.

At step S514, it is determined whether the value of the counter is larger than a predetermined threshold. In this judgment, it is determined whether the range error average $d_{ave\_}$j and the range error standard deviation σd_j which were computed while the vehicle 90 was in a stop state are reliable. The predetermined threshold may be set to an appropriate value, taking into consideration the viewpoint. For example, with respect to the number of 10-20 samples or more, the predetermined threshold may be set to an arbitrary value in a range between 11 and 21.

When the value of the counter is larger than the predetermined threshold, the control progresses to step S516. When the value of the counter is less than the predetermined threshold, it is determined that the reliability of the range error average $d_{ave\_}$j and the range error standard deviation σd_j computed while the vehicle 90 was in a stop state is low (e.g., when the time of vehicle stop is very short). In this case, the processing routine for the current period is completed and the control is returned to step S500.

At step S516, each component of weight matrix W is determined by the weight matrix generation part 48 based on the range error average $d_{ave\_}$j and the range error standard deviation σd_j which were computed at the above steps S510 and S512 for the last period during the vehicle stop. The components of weight matrix W are zero except its diagonal components, and the range error standard deviation σd_j computed by the σd computing part 46 is substituted for each diagonal component.

In the following, for the sake of convenience of description, suppose that four GPS satellites $10_1$, $10_2$, $10_3$, and $10_4$ can be observed currently. In this case, the weight matrix W is represented by the following equation.

$$W = \begin{pmatrix} \frac{1}{\sigma\_d_1} & 0 & 0 & 0 \\ 0 & \frac{1}{\sigma\_d_2} & 0 & 0 \\ 0 & 0 & \frac{1}{\sigma\_d_3} & 0 \\ 0 & 0 & 0 & \frac{1}{\sigma\_d_4} \end{pmatrix} \quad \text{Equation 4}$$

At step S518, the weighted positioning computation part 49 performs the weighted positioning computation using the weight matrix W generated at the above step S516, based on pseudo distances ρ1, ρ2, ρ3, and ρ4 observed for the current period, in order to determine the current position (Xu, Yu, Zu) of the vehicle 90.

For example, the weighted positioning computation is performed using the weighted least square method as in the following.

First, as a premise, the following equation is satisfied between pseudo distance ρj, satellite position (Xj, Yj, Zj), and vehicle position (Xu, Yu, Zu).

$$\rho_j = \sqrt{(X_j - X_u)^2 + (Y_j - Y_u)^2 + (Z_j - Z_u)^2} + c \cdot \Delta T \quad \text{Equation 5}$$

Supposing b=c·ΔT, the unknown values (Xu, Yu, Zu, b) are set to a state quantity η, and the general approximation formula in which the above equation 5 is linearized by the state quantity η is as follows.

$$\Delta \rho_j = \frac{\partial \rho_j}{\partial X_u} \Delta X_u + \frac{\partial \rho_j}{\partial Y_u} \Delta Y_u + \frac{\partial \rho_j}{\partial Z_u} \Delta Z_u + \Delta b \quad \text{Equation 6}$$

Δρj is represented by the following equation, assuming that the initial appropriate values of the state quantity η are set to (0, 0, 0, 0).

$$\Delta \rho_j = \rho_j - \sqrt{X_j^2 + Y_j^2 + Z_j^2} \quad \text{Equation 7}$$

The partial-differential terms of the equation 6 are represented by the following equations:

$$\frac{\partial \rho_j}{\partial X_u} = \frac{X_j}{\rho_j} = \alpha_j \quad \frac{\partial \rho_j}{\partial Y_u} = \frac{Y_j}{\rho_j} = \beta_j \quad \frac{\partial \rho_j}{\partial Z_u} = \frac{Z_j}{\rho_j} = \gamma_j \quad \text{Equation 8}$$

If Δρj is assumed as being an observation quantity zj, the relationship between the observation quantity zj and the state quantity η is represented using an observation matrix H as follows.

$$Z_j = H \cdot \eta^T$$

In the above formula, the observation quantity z and the observation matrix H of the four GPS satellites $10_1$, $10_2$, $10_3$, and $10_4$ are represented as follows.

$$H = \begin{pmatrix} \alpha_1 & \beta_1 & \gamma_1 & 1 \\ \alpha_2 & \beta_2 & \gamma_2 & 1 \\ \alpha_3 & \beta_3 & \gamma_3 & 1 \\ \alpha_4 & \beta_4 & \gamma_4 & 1 \end{pmatrix} z = \begin{pmatrix} \Delta\rho_1 \\ \Delta\rho_2 \\ \Delta\rho_3 \\ \Delta\rho_4 \end{pmatrix} \qquad \text{Equation 9}$$

Therefore, the state quantity η can be determined using the weight matrix W as follows.

$$\eta = (H^T W H)^{-1} H^T W z \qquad \text{Equation 10}$$

It is preferred that, in the above-mentioned weighted positioning computation, the corrected pseudo distance ρj which is corrected by the range error average $d_{ave\_j}$ is used as the observation quantity zj, rather than using the pseudo distance ρj as the observation quantity zj. Namely, the preferred observation quantity zj is represented as follows.

$$z_j = \Delta\rho_j - d_{ave\_j} = (\rho_j - d_{ave\_j}) - \sqrt{X_j^2 + Y_j^2 + Z_j^2} \qquad \text{Equation 11}$$

The thus obtained positioning results with respect to the position (Xu, Yu, Zu) of the vehicle 90 may be outputted to, for example, a navigation system.

At step S520, it is determined whether the moving state of the vehicle 90 is changed to a stop state, based on the judgment result from the vehicle stop judgment part 40. When the vehicle 90 changes from the moving state to a stop state, the control is returned to step S500. On the other hand, when the vehicle 90 is moving, the control progresses to step S518. In this case, the processing of step S518 is continuously performed based on the pseudo distance ρj and the satellite position (Xj, Yj, Zj) which are observed at any time during movement of the vehicle 90.

When the GPS satellites 10 which can be observed are changed during movement of the vehicle 90, the weight matrix W may be determined again according to the change of the GPS satellites 10. For example, when observation of a certain GPS satellite 10k becomes impossible, the weight matrix W in which the components relating the GPS satellite 10k concerned are eliminated is generated, and then the weighted positioning computation is performed based on the observation quantity zj applied to other GPS satellites 10j from which the observation quantity zk of the GPS satellite 10k concerned is eliminated.

When a new GPS satellite 10k (which was not observed while the vehicle 90 was in a stop state) is observed, the range error average $d_{ave\_k}$ and the range error standard deviation σd_k are not computed with respect to the new GPS satellite 10k. In this case, the weighted positioning computation may be performed using appropriate initial values of the weighting factors for the diagonal components of the weight matrix.

According to the vehicle position positioning processing of FIG. 5, the range error average $d_{ave\_j}$ used as the weighting factor of the weight matrix W is computed based on the observational data of each GPS satellite 10j while the vehicle 90 is in a stop state, and the weighting factor of the weight matrix W can be set up with good reliability. Since there is no influence by the error factor caused by movement of the vehicle 90 when the vehicle 90 is in a stop state, the errors included in the observational data of each GPS satellite 10j (the observed value of pseudo distance ρj) can be estimated for every GPS satellite 10j with a high precision. Thus, according to the vehicle position positioning processing of FIG. 5, an appropriate weight matrix W is set up during a stop of the vehicle 90, and precise positioning results can be obtained during movement of vehicle 90.

Since the pseudo distance ρj is corrected by the range error average $d_{ave\_j}$ and the weighted positioning computation is performed, precise positioning results can be obtained. Namely, the errors included in the pseudo distance ρj are eliminated by using the range error average $d_{ave\_j}$, and precise positioning results can be obtained.

Since the range error average $d_{ave\_j}$ is computed based on the observational data of each GPS satellite 10j while the vehicle 90 is in a stop state, it is possible to make the precision of positioning results high.

In the vehicle position positioning processing shown in FIG. 5, the variance σd_j$^2$ of the errors dj of pseudo distance ρj may be substituted for the diagonal components of the weight matrix W, instead of the range error standard deviation σd_j.

Figure 6:
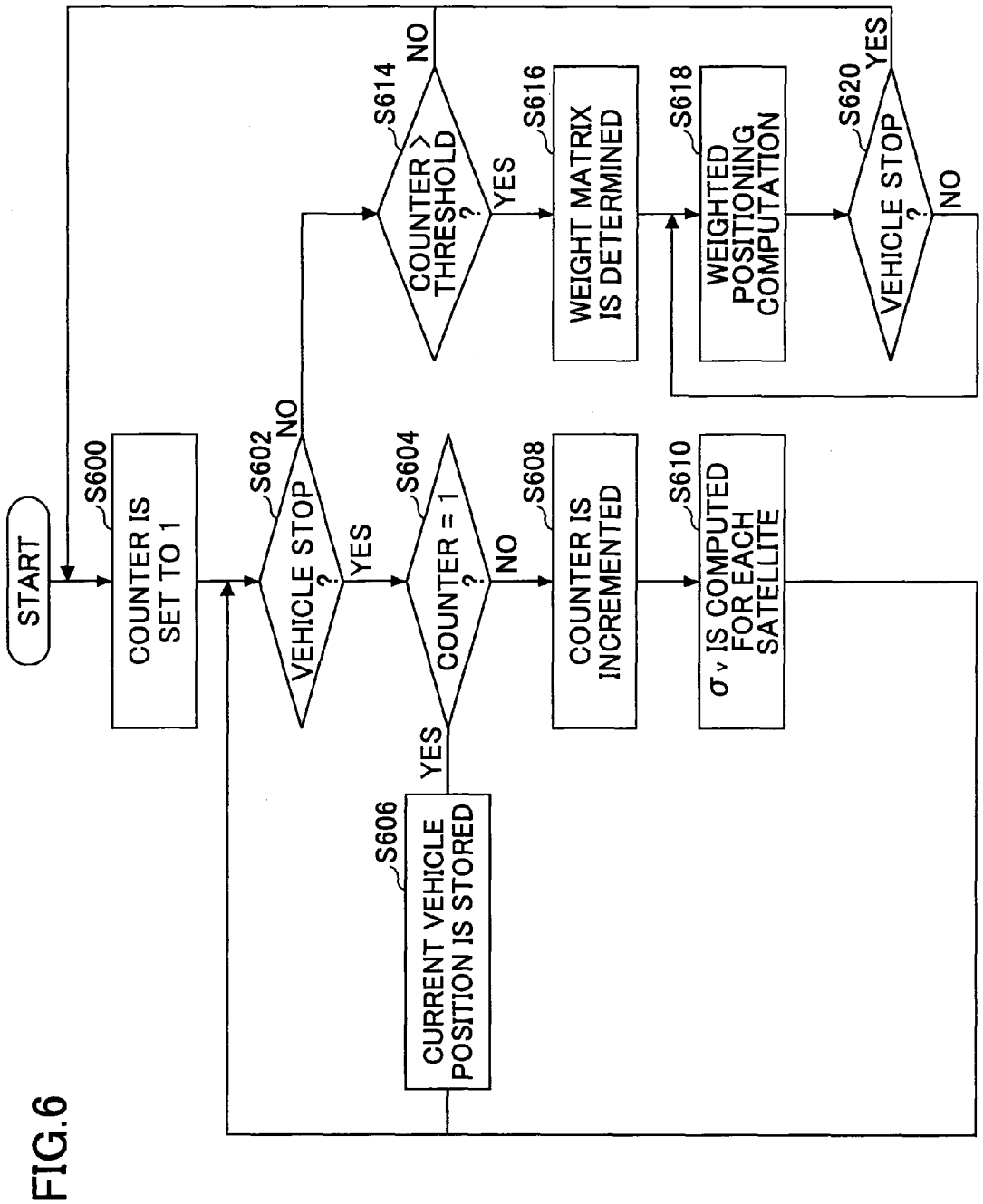
FIG. 6 is a flowchart for explaining a vehicle speed positioning processing which is performed by the positioning part of this embodiment.

FIG. 6 is a flowchart for explaining a vehicle speed positioning processing which is performed by the positioning part 50 of this embodiment.

Execution of the processing routine shown in FIG. 6 is repeated for every predetermined period during the active operation period from the instant the ignition switch of the vehicle 90 is turned ON to the instant the ignition switch is turned OFF. The predetermined period may be equivalent to the above-mentioned observation period.

Although the processing routine of FIG. 6 is illustrated separately from the processing routine of FIG. 5, the routines may be performed in parallel separately. Alternatively, the routines may be integrated into one processing routine, and the integrated processing routine may be performed by the positioning part 50 of this embodiment.

At step S600, the counter is initialized. Namely, the value of a counter is set to 1.

At step S602, it is determined whether the vehicle 90 is currently in a stop state, based on the judgment result from the vehicle stop judgment part 40. When the vehicle 90 is in a stop state, the control progresses to step S604. On the other hand, when the vehicle 90 is moving, the control progresses to step S614.

At step S604, it is determined whether the value of the counter is currently equal to 1. When the value of the counter is equal to 1, the control progresses to step S606. On the other hand, when the value of the counter is larger than 1, the control progresses to step S608.

At step S606, the position (Xu, Yu, Zu) of vehicle 90 based on the newest positioning results is stored as vehicle position u0=(Xu0, Yu0, Zu0) immediately after a vehicle stop. The vehicle position u0=(Xu0, Yu0, Zu0) immediately after a vehicle stop may be what is computed by the weighted positioning computation, or may be what is computed by another positioning method (for example, inertial navigation).

At step S608, the value of the counter is incremented by 1.

At step S610, the standard deviation σv_j of the errors of vehicle speed Vu_j in the viewing line direction of vehicle 90 to GPS satellite 10j (called "speed standard deviation σv_j") is computed for every GPS satellite 10j by the σv computing part 42.

It should be noted that the speed standard deviation σv_j is a standard deviation of the errors of vehicle speed Vu_j which is observed in a stop state of the vehicle. For example, the speed standard deviation σv_j of GPS satellite 10j is computed by the following formula:

$$\sigma v\_j^2 = \Sigma (Vu\_j(i) - V\text{ave}\_j)^2 / n$$

In the above formula, σv_j$^2$ denotes the variance of the errors of vehicle speed Vu_j, Vu_j(i) denotes the vehicle speed Vu_j of GPS satellite 10j which is computed for the i-th period, assuming that Vu_j(1) denotes the vehicle speed Vu_j of GPS satellite 10j computed for the 1st period after a vehicle stop is detected, and Vave_j denotes the average of Vu_j(i) computed for the respective periods. For example, Vave_j is computed by the following equation:

$$V_{ave\_j} = \frac{1}{2} \cdot \sum_{i=1}^{n} V_{u\_j}(i)$$

Equation 12 where n denotes the number of data items. In this example, n=(counter value). The value of Vave_j may be set to zero taking into consideration the fact that the vehicle 90 is in a stop state. In this case, the speed standard deviation σv_j is substantially a standard deviation of the errors of vehicle speed Vu_j.

The vehicle speed Vu_j(i) is computed as follows, using the relationship between the Doppler range dρj of GPS satellite 10j, the unit vector lj(i) in the viewing line direction of vehicle 90 to GPS satellite 10j, and the satellite moving speed vector Vj=(Vj(i), Vj(i), Vj(i)) of GPS satellite 10j.

$$V_{u\_j}(i) = d\rho_j - l_j \cdot V_j$$

Equation 13

For example, the Doppler range dρj(i) is computed by the formula: dρj(i)=λ·Δfj(i), using the wavelength λ (known) of the carrier, and the Doppler frequency Δfj of GPS satellite 10j which is obtained at the period (i). In the above-mentioned formula, lj·Vj is an inner product of the unit vector lj and the satellite moving speed vector Vj. For example, the unit vector lj(i) is computed as follows, using the vehicle position u0= (Xu0, Yu0, Zu0) immediately after a stop of the vehicle, stored at the above step S606, the position S(i)=(Xj, Yj, Zj) of GPS satellite 10j, and the distance rj(i) between vehicle 90 and GPS satellite 10j.

$$l_j = 1/r_j(i) \cdot (X_j(i) - X_{u0}, Y_j(i) - Y_{u0}, Z_j(i) - Z_{u0})$$

Equation 14

In the above equation, rj(i) is represented by the following equation.

$$r_j(i) = \sqrt{(X_j(i) - X_{u0})^2 + (Y_j(i) - Y_{u0})^2 + (Z_j(i) - Z_{u0})^2}$$

Equation 15

In this manner, when the vehicle 90 is in a stop state, the processing of step S608 and step S610 is repeated, and based on the data observed during a stop state of the vehicle 90, the speed standard deviation σv_j is computed for every GPS satellite 10j for every predetermined period. It is a matter of course that, as the number of periods (i) when the vehicle 90 is in a stop state increases, the number of samples increases, and therefore, the reliability of the speed standard deviation σv_j increases.

Thus, the speed standard deviation σv_j computed when the vehicle 90 is in a stop state will be used in the following steps S614-S618 effectively in the positioning of the speed of the vehicle 90 when the vehicle 90 will start running after the stop state.

At step S614, it is determined whether the value of the counter is larger than a predetermined threshold. In this judgment, it is determined whether the speed standard deviation σv_j which was computed when the vehicle 90 was in a stop state is reliable. The predetermined threshold may be set to an appropriate value, taking into consideration the viewpoint. For example, with respect to the number of 10-20 samples or more, the predetermined threshold may be set to an arbitrary value in a range between 11-21.

When the value of the counter is larger than the predetermined threshold, the control progresses to step S616. When the value of the counter is less than the predetermined threshold, it is determined that the reliability of the speed standard deviation σv_j computed when the vehicle 90 was in a stop state (e.g., when the time of vehicle stop is very short) is low. In this case, the processing routine for the current period is completed and the control is returned to step S600.

At step S616, each component of weight matrix W_v is determined by the weight matrix generation part 48 based on the speed standard deviation σv_j which was computed at the above step S610 for the last period during the vehicle stop. The components of weight matrix W_v are zero except its diagonal components, and the speed standard deviation σv_j computed by the σv computing part 42 is substituted for each diagonal component.

In the following, for the sake of convenience of description, suppose that four GPS satellites $10_1$, $10_2$, $10_3$, and $10_4$ can be observed currently. In this case, the weight matrix W_v is represented by the following equation.

$$W\_v = \begin{pmatrix} \frac{1}{\sigma\_{v_1}} & 0 & 0 & 0 \\ 0 & \frac{1}{\sigma\_{v_2}} & 0 & 0 \\ 0 & 0 & \frac{1}{\sigma\_{v_3}} & 0 \\ 0 & 0 & 0 & \frac{1}{\sigma\_{v_4}} \end{pmatrix}$$

Equation 16

At step S618, the weighted positioning computation part 49 performs the weighted positioning computation using the weight matrix W_v generated at the above step S616, based on Doppler ranges dρ1, dρ2, dρ3, and dρ4 observed for the current period, in order to determine the current speed v=(vu, vu, vu) of the vehicle 90.

For example, the weighted positioning computation is performed using the weighted least square method as in the following.

First, as a premise, the following equation is satisfied between Doppler range dρj, satellite moving speed vector V, and vehicle speed vector v=(vu, vu, vu) of vehicle 90.

$$\dot{\rho}_j = \dot{r}_j + \dot{b} + \dot{I} + \dot{T}$$
$$= (V_j - v) \cdot l_j + \dot{b} + \varepsilon$$

Equation 17

In the above formula, the "black dot" affixed to the top of the character denotes a dot (time differential). For example, the time differential of the Doppler range dρj is indicated as ρj dot (time differential).

Since I dot and T dot denote the amount of change of ionospheric errors and the amount of change of troposphere errors and they are very small, they are indicated as whitenoise ε. b dot denotes a differential value of a clock error. The above equation 17 may be modified as follows, when the observation data from the four GPS satellites $10_1$, $10_2$, $10_3$, and $10_4$ are used.

$$\begin{bmatrix} \dot{p}_1 - l_1 \cdot v_1 \\ \dot{p}_2 - l_2 \cdot v_2 \\ \dot{p}_3 - l_3 \cdot v_3 \\ \dot{p}_4 - l_4 \cdot v_4 \end{bmatrix} = \begin{bmatrix} (-l_1)^T & 1 \\ (-l_2)^T & 1 \\ (-l_3)^T & 1 \\ (-l_4)^T & 1 \end{bmatrix} \begin{bmatrix} v \\ b \end{bmatrix} + \varepsilon \quad \text{Equation 18}$$

Let the left-side matrix of the above equation 18 be the observation quantity z. "dρj" of the observation quantity zj of GPS satellite $10j$ is computed by the formula: dρj(i)=λ·Δfj(i) based on the Doppler frequency Δfj(i). "lj·Vj" of the observation quantity zj of GPS satellite $10j$ is an inner product of the unit vector lj(i) for the period (i) and the satellite moving speed vector Vj(i). For example, the satellite moving speed vector Vj(i) is computed by the satellite position computing part 124, based on the satellite orbit information of the navigation message. For example, the unit vector lj(i) for the period (i) may be computed as follows, using the positioning results (Xu(i), Yu(i), Zu(i)) of the position of vehicle 90 computed for the period (i) by the weighted positioning computation part 49 (step S518 of FIG. 5).

$$l_j = \frac{1}{r_j}(i) \cdot (X_j(i) - X_u, Y_j(i) - Y_u, Z_j(i) - Z_u) \quad \text{Equation 19}$$

$$r_j(i) = \sqrt{(X_j(i) - X_u)^2 + (Y_j(i) - Y_u)^2 + (Z_j(i) - Z_u)^2}$$

And the observation matrix G is set up as follows.

$$G = \begin{bmatrix} (-l_1)^T & 1 \\ (-l_2)^T & 1 \\ (-l_3)^T & 1 \\ (-l_4)^T & 1 \end{bmatrix} \quad \text{Equation 20}$$

The state quantity η includes a vehicle speed vector v=(vu, vu, vu) of vehicle 90 and a b dot. If η=(v, b dot) is assumed, the state quantity η may be determined using the weight matrix W_v as follows.

$$\eta = (G^T W\_v G)^{-1} G^T W\_v z \quad \text{Equation 21}$$

The thus obtained positioning results with respect to the vehicle speed vector v of vehicle 90 may be outputted to, for example, a navigation system.

At step S620, it is determined whether the moving state of the vehicle 90 is changed to a stop state, based on the judgment result from the vehicle stop judgment part 40. When the vehicle 90 changes from the moving state to a stop state, the control is returned to step S600. On the other hand, when the vehicle 90 is moving, the control progresses to step S618. In this case, the processing of step S618 is continuously performed based on the Doppler range dρj, the satellite moving speed vector Vj, etc. which are observed at any time during movement of the vehicle 90.

When the GPS satellites 10 which can be observed are changed during movement of the vehicle 90, the weight matrix W_v may be determined again according to the change of the GPS satellites 10. For example, when observation of a certain GPS satellite $10k$ becomes impossible, the weight matrix W_v in which the components relating to the GPS satellite $10k$ concerned are eliminated is generated, and then the weighted positioning computation is performed based on the observation quantity zj applied to other GPS satellites $10j$ from which the observation quantity zk of the GPS satellite $10k$ concerned is eliminated.

When a new GPS satellite $10k$ (which was not observed when the vehicle 90 was in a stop state) is observed, the speed standard deviation σv_k is not computed with respect to the new GPS satellite $10k$. In this case, the weighted positioning computation may be performed using appropriate initial values of the weighting factors for the diagonal components of the weight matrix.

According to the vehicle speed positioning processing of FIG. 6, the speed standard deviation σv_j used as the weighting factor of the weight matrix W_v is computed based on the observational data of each GPS satellite $10j$ when the vehicle 90 is in a stop state, and the weighting factor of the weight matrix W_v can be set up with good reliability. Since there is no influence by the error factor resulting from movement of the vehicle 90 when the vehicle 90 is in a stop state, the errors included in the observational data of each GPS satellite $10j$ (the observed value of Doppler range dρj) can be estimated for each GPS satellite $10j$ with a high precision. Thus, according to the vehicle speed positioning processing of FIG. 6, an appropriate weight matrix W_v is set up during a stop of the vehicle 90 using the fact that the vehicle position remains unchanged (namely, the vehicle speed is zero during a stop of vehicle 90), and precise positioning results can be obtained during movement of the vehicle 90.

In the vehicle speed positioning processing shown in FIG. 6, the variance σv_j$^2$ may be substituted for the diagonal components of the weight matrix W_v, instead of the speed standard deviation σv_j.

The present invention is not limited to the above-described embodiments, and various variations and modifications may be made without departing from the scope of the present invention.

For example, alternatively, the weight matrix W and the weighting factor W_v in the above-mentioned embodiments may be set up, taking into consideration other factors, such as the residual difference at the time of positioning computation for the previous period, the difference in the elevation angle of each satellite, and the difference in the intensity of the satellite signal received from each satellite.

In the above-mentioned embodiments, the pseudo distance ρ is computed using the C/A code. Alternatively, the pseudo distance ρ may be measured based on another pseudo noise code, such as a P code of L2 wave. Since it is enciphered in W code in the case of the P code, the P code may be obtained when performing the P-code synchronization, by using a DLL using a cross-correlation system.

The pseudo distance ρ based on the P code can be determined as ρ'$_P$=M$_P$×30 by measuring that the M$_P$-th bit of the P code is received at the vehicle 90 noting that the P code is the 0th bit in the GPS satellite 10$_1$.

In the above-mentioned embodiments, the example in which the invention is applied to a GPS has been described. However, the invention is also applicable to another GNSS (global navigation satellite system), such as a satellite system other than GPS, Galileo etc.

Figure 7:
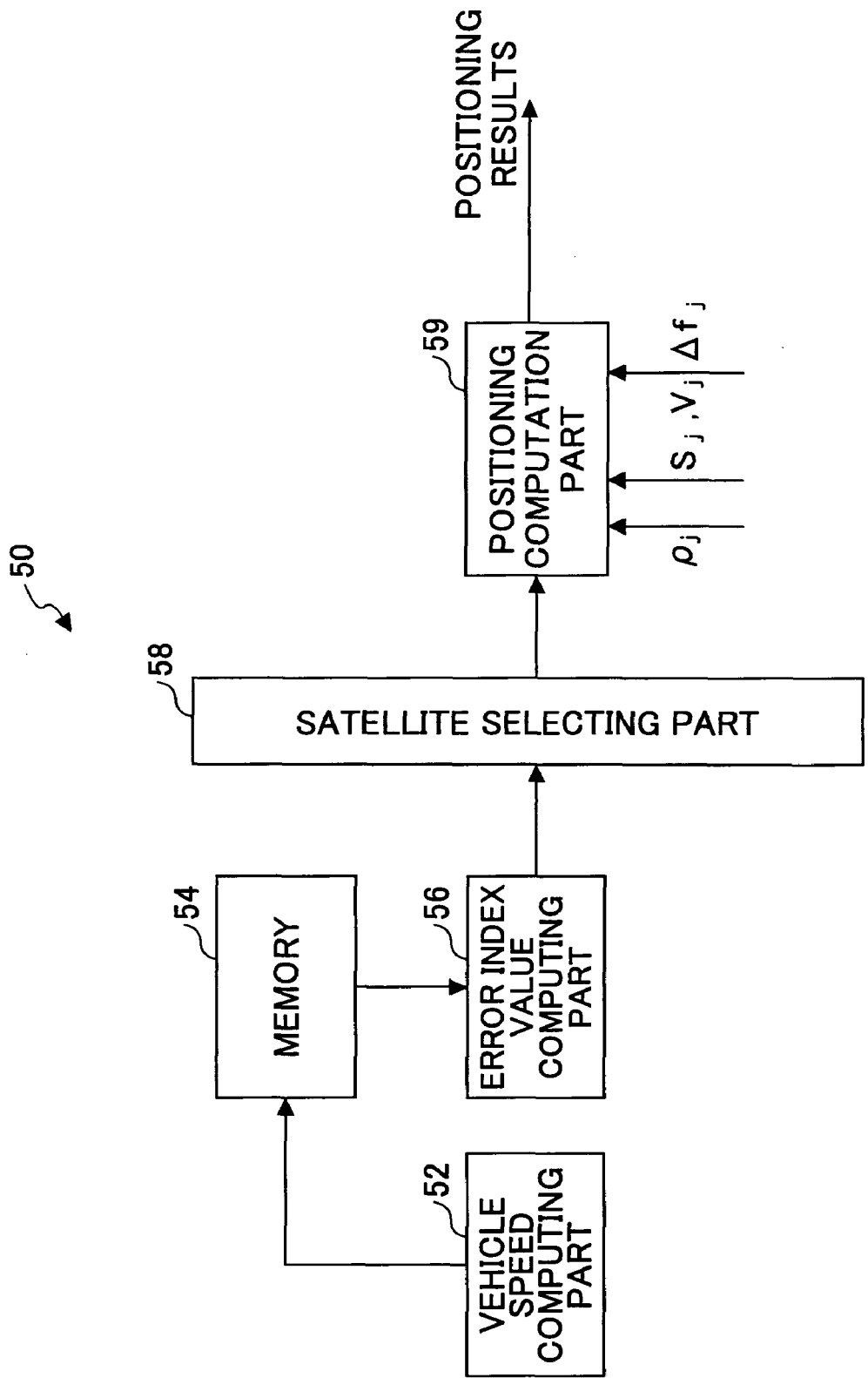
FIG. 7 is a block diagram showing the composition of a positioning part in another embodiment of the invention.

Next, FIG. 7 shows the composition of a positioning part 50 in another embodiment of the invention.

As shown in FIG. 7, the positioning part 50 of this embodiment includes a vehicle speed computing part 52, a memory 54 which stores the vehicle speed computed by the vehicle speed computing part 52, an error index value computing part 56, a satellite selecting part 58, and a positioning computation part 59. The respective functions of the parts 52, 54, 56, 58 and 59 will be explained with reference to FIG. 8 through FIG. 10.

Figure 8:
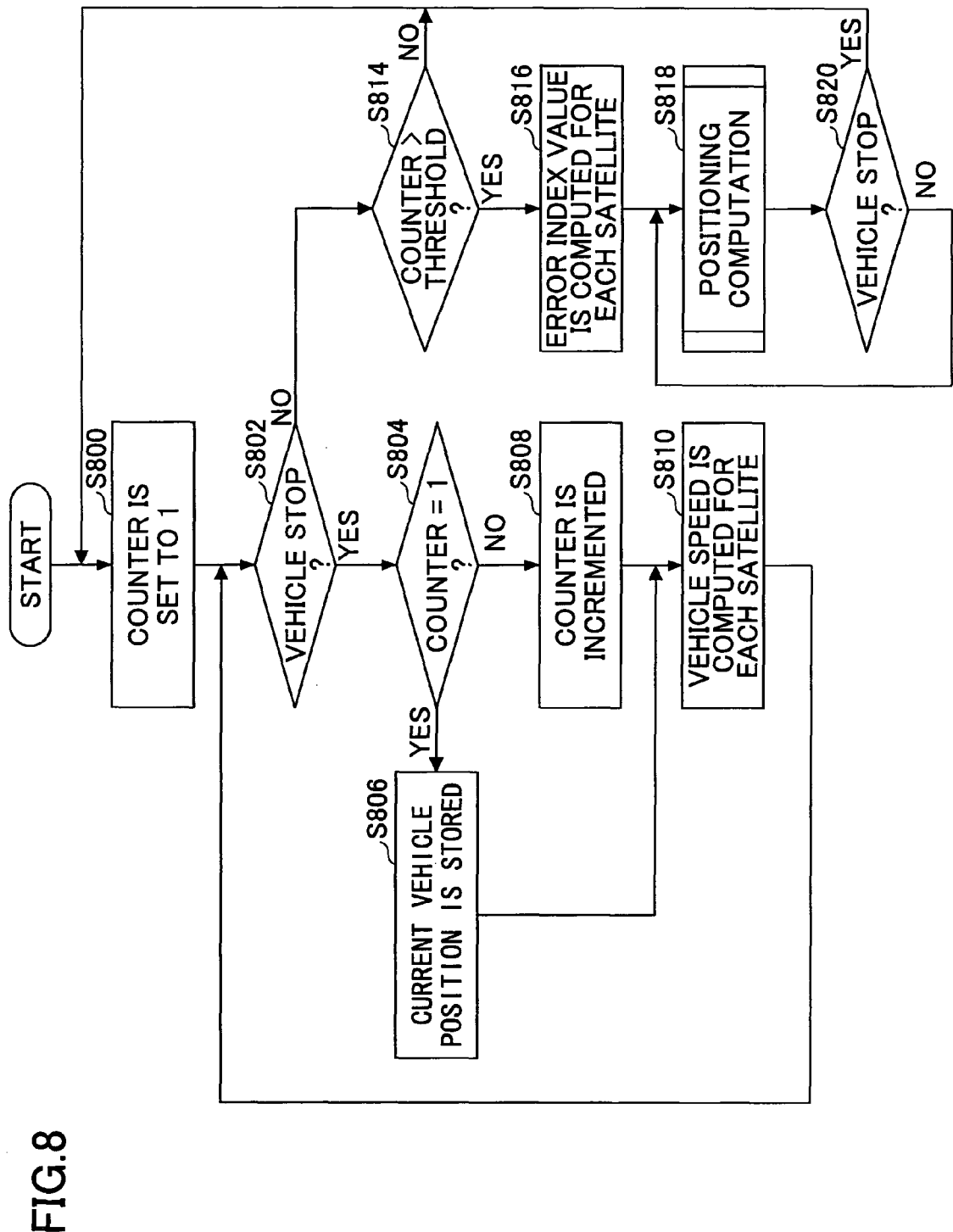
FIG. 8 is a flowchart for explaining a positioning processing which is performed by the positioning part of this embodiment.

FIG. 8 is a flowchart for explaining a positioning processing which is performed by the positioning part 50 of this embodiment.

Execution of the processing routine shown in FIG. 8 is repeated for every predetermined period during an active operation period from the instant the ignition switch of the vehicle 90 is turned ON to the instant the ignition switch is turned OFF. The predetermined period may be equivalent to the above-mentioned observation period.

At step S800, the counter and the memory 54 are initialized. Namely, the value of the counter is set to "1" and the data in the memory 54 is initialized (cleared).

At step S802, it is determined whether the vehicle 90 is currently in a stop state, based on the judgment result from the vehicle stop judgment part 40.

When the vehicle 90 is in a stop state, the control progresses to step S804. Typically, this situation may be a situation before the vehicle 90 starts running after an engine start, or a situation in which the vehicle 90 stops temporarily in front of a traffic signal after a start of vehicle running. On the other hand, when the vehicle 90 is moving, the control progresses to step S814.

At step S804, it is determined whether the value of the counter is currently equal to 1. When the value of the counter is currently equal to 1, the control progresses to step S806. On the other hand, when the value of the counter is larger than 1, the control progresses to step S808.

At step S806, the position (Xu, Yu, Zu) of vehicle 90 based on the newest positioning result is stored as vehicle position u0=(Xu 0, Yu0, Zu0) immediately after a vehicle stop.

The vehicle position u0=(Xu0, Yu0, Zu0) immediately after the vehicle stop may be computed through the positioning computation by the positioning computation part 59, or may be computed by another positioning method (for example, inertial navigation). When using inertial navigation, it is preferred to use an inertial navigation in which the vehicle position corrected by matching the image recognition result of road signs using an in-vehicle camera with map data including the known position information of road signs is used as an initial position.

At step S808, the value of the counter is incremented by 1.

At step S810, the vehicle speed Vu_j in the viewing line direction of vehicle 90 to GPS satellite 10j is computed for every GPS satellite 10j by the vehicle speed computing part 52 about GPS satellite 10j which can be currently observed. The subscript "j" denotes the satellite number (j=1, 2, 3, 4, . . . ) of GPS satellite 10 which can be currently observed, and it is a value specific to each GPS satellite 10.

It should be noted that the vehicle speed Vu_j is a vehicle speed Vu_j which is observed a stop state of the vehicle. The vehicle speed Vu_j(i) is computed using the relationship between the Doppler range dρj(i) of GPS satellite 10j, the unit vector lj(i) in the viewing line direction of vehicle 90 to GPS satellite 10j, and the satellite moving speed vector Vj=(Vj(i), Vj(i), Vj(i)) of GPS satellite 10j. For example, the vehicle speed Vu_j(i) is computed by the following equation, wherein (i) denotes the value obtained for the i-th period, assuming that the 1$^{st}$ value is obtained for the first period after a vehicle stop is detected.

$$V_{u\_j}(i) = d\rho_j - l_j \cdot V_j \quad \text{Equation 22}$$

For example, the Doppler range dρj(i) is computed by the formula: dρj(i)=λ·Δfj(i), using the Doppler frequency Δfj(i) of GPS satellite 10j which is obtained with the wavelength λ (known) of the carrier and the period (i). In the above equation 22, lj·Vj is an inner product of the unit vector lj and the satellite moving speed vector Vj. For example, the unit vector lj is computed by the following equation, using the vehicle position u0=(Xu0, Yu0, Zu0) immediately after the vehicle stop, which was stored at the above step S806, the position S(i)=(Xj(i), Yj(i), Zj(i)) of GPS satellite 10j, and the distance rj(i) between vehicle 90 and GPS satellite 10j.

$$l_j = 1/r_j(i) \cdot (X_j(i) - X_{u0}, Y_j(i) - Y_{u0}, Z_j(i) - Z_{u0}) \quad \text{Equation 23}$$

In the above equation 23, the rj(i) is represented by the following equation.

$$r_j(i) = \sqrt{(X_j(i) - X_{u0})^2 + (Y_j(i) - Y_{u0})^2 + (Z_j(i) - Z_{u0})^2} \quad \text{Equation 24}$$

Alternatively, the vehicle speed Vu_j(i) may be computed by the following approximation, using the pseudo distance ρj(i) inputted from the filter 130 for the current period, and the pseudo distance ρj(i−1) inputted from the filter 130 for the previous period.

$$V_{u\_j}(i) = \frac{\rho_j(i) - \rho_j(i-1)}{\Delta t} \quad \text{Equation 25}$$

where Δt denotes a sampling period (observation period) of pseudo distance ρj.

Alternatively, the vehicle speed Vu_j(i) may be computed by the following approximation, using the integrated value φj(i) of the carrier phase observed for the current period, and the integrated value φj (i−1) of the carrier phase observed for the previous period.

$$V_{u\_j}(i) = \lambda \cdot \frac{\varphi_j(i) - \varphi_j(i-1)}{\Delta t} \quad \text{Equation 26}$$

In order to measure the exact value of the integrated value φ(i) of the carrier phase, it is necessary to use the integral-value bias which is estimated by an appropriate estimation method (for example, interference positioning method). However, since obtaining a difference in the integrated value φj between the previous period and the current period is adequate, an appropriate integral-value bias may be used.

It is preferred to use one of the three kinds of computation methods of vehicle speed Vu_j mentioned above in common for each GPS satellite 10j. This is because the vehicle speed Vu_j of each GPS satellite 10j should be relatively estimated under the same conditions.

At this time, the final vehicle speed Vu_j for each GPS satellite 10j may be computed by combining suitable weighting factors with each vehicle speed Vu_j computed by using all of the three kinds of the above-mentioned computation methods, or any two methods of them.

Alternatively, taking into consideration the features of the three kinds of computation methods as shown in the following Table 1, one of the three kinds of the above-mentioned computation methods of vehicle speed Vu_j may be selected according to a situation for occurrence of every vehicle stop. For example, under the situation where a multiple path is detected, the computation method of the equation 22 or the equation 26 which has a good resistance to a multiple path may be selected, or a relatively large weight may be applied to the computation value of the equation 22 or the equation 26.

For example, under the situation in which the influence from the ionized layer is easily given due to the GIM (Global Ionoshere Map) etc., the computation method of the equation 22 which has a good resistance to the influence from the ionized layer may be adopted, or a relatively large weight may be applied to the computation value of the equation 22.

TABLE 1

| Computing Method | Features |
| --- | --- |
| Doppler (Eq. 22) | small influences by the ionized layer<br>good resistance to multiple path<br>outputting one sample is possible |
| Pseudo Range (Eq. 25) | measuring distance from the satellite is possible |
| Carrier (Eq. 26) | good resistance to noise<br>good resistance to multiple path |

In this manner, the vehicle speed Vu_j(i) computed by the vehicle speed computing part 52 is stored in the memory 54. Therefore, when the vehicle 90 is in a stop state, the processing of step S808 and step S810 is repeated. Based on the data observed at any time when the vehicle 90 is in a stop state, the speed standard deviation σv_j is computed for every GPS satellite 10j for every predetermined period, and it is stored in the memory 54 at any time.

It is a matter of course that as the periodicity i when the vehicle 90 is in a stop state increases, the number of samples increases, and the reliability of the vehicle speed Vu_j increases accordingly.

In this manner, the vehicle speed Vu_j computed when the vehicle 90 is in a stop state is used at the subsequent steps S814-S818 effectively in the positioning of the position of vehicle 90 after the vehicle 90 starts moving after the vehicle stop.

At step S814, it is determined whether the value of the counter is larger than a predetermined threshold. In this judgment, it is determined whether the vehicle speed Vu_j which was computed when the vehicle 90 was in a stop state is reliable. The predetermined threshold may be set to an appropriate value, taking into consideration the viewpoint. For example, with respect to the number of 10-20 samples or more, the predetermined threshold may be set to an arbitrary value in a range between 11 and 21.

When the value of the counter is larger than the predetermined threshold, the control progresses to step S816. When the value of the counter is less than the predetermined threshold, it is determined that the reliability of the vehicle speed Vu_j computed when the vehicle 90 was in a stop state is low (e.g., when the time of vehicle stop is very short). In this case, the processing routine for the current period is completed and the control is returned to step S800.

At step S816, the index value qj which indicates the error of the vehicle speed Vu_j is computed for every GPS satellite 10j by the error index value computing part 56, based on the vehicle speed (the stored data in the memory 54) which was computed when the vehicle 90 was in a stop state.

It should be noted that the true value of vehicle speed Vu_j is zero because the vehicle speed Vu_j is the speed when the vehicle 90 was in a stop state. Therefore, the value of vehicle speed Vu_j indicates the error of the computed vehicle speed Vu_j. For example, the index value qj indicating the error of vehicle speed Vu_j may be computed by the following equation, as the average Vave_j of the errors of the vehicle speed Vu_j.

$$q_j = \frac{1}{n} \cdot \sum_{i=1}^{n} V_{u\_j}(i) \qquad \text{Equation 27}$$

where n denotes the number of data items. In this example, n=(counter value).

Alternatively, the error index value qj may be computed by the following equation as the variance σv_j² of the errors of the vehicle speed Vu_j.

$$q_j = \sigma_{v\_j}^2 = \frac{1}{n} \cdot \sum_{i=1}^{n} (V_{u\_j}(i) - V_{ave\_j})^2 \qquad \text{Equation 28}$$

where Vave_j may be computed by the above equation 27, or the fixed value zero may be used, taking into consideration the fact that the vehicle 90 was in a stop state.

Alternatively, the error index value qj may be computed as the standard deviation σv_j of the errors of the vehicle speed Vu_j. Namely, it may be computed as qj=σv_j. Alternatively, the error index value qj may be a low pass value LPFv_j obtained by applying the vehicle speed Vu_j to a low pass filter. For example, a low pass filter having a given time constant τ which is represented by the following equation may be used for computation of the low pass value LPFv_j for the period (i).

$$LPF_{v\_j}(i) = \frac{ST}{ST+\tau} \times V_{u\_j}(i) + \frac{\tau}{ST+\tau} \times LPF_{v\_j}(i-1) \qquad \text{Equation 29}$$

where ST denotes the sampling interval of the data of vehicle speed Vu_j. To the low pass filter, the vehicle speed Vu_j(i) for each period (i=1, 2, 3, . . . , n) obtained during a stop of the vehicle is applied sequentially or collectively, and the finally obtained low pass value LPFv_j(n) is treated as the error index value qj.

Alternatively, the error index value qj(i) may be computed by the following equation, as the rate of change ΔLPFv_j of the low pass value LPFv_j.

$$\Delta LPF_{v\_j} = \frac{LPF_{v\_j}(n) - LPF_{v\_j}(m)}{(n-m) \times ST} \qquad \text{Equation 30}$$

where m is a predetermined positive number and it is predetermined experimentally. The above equation 30 may be used even when m>n. The above equation 30 is to determine a rate of change ΔLPFv_j of the low pass value between the low pass value LPFv_j(m) for the period (m) and the low pass value LPFv_j(n) for the last period (n). Alternatively, it may be determined by obtaining a plurality of rates of change of the low pass value among a plurality of periods respectively and taking the average of the plurality of rates of change.

Alternatively, the error index value qj may be computed by combining two or more of the above-mentioned index values including the average Vave_j, the variance σv_j², the standard deviation σv_j, the low pass value LPFv_j, and the rate of change ΔLPFv_j of the low pass value. In such a case, taking into consideration the features of the respective error index values as shown in the following Table 2, an appropriate weight may be applied and combined to the respective index values according to a situation.

Alternatively, taking into consideration the features of the respective error index values as shown in the following Table 2, a suitable one of the respective error index values may be selected according to a situation.

For example, when the time of vehicle stop is short and the data items are acquired from ten or less samples, the low pass value LPFv_j or the rate of change ΔLPFv_j of the low pass value may be used. When the low pass value LPFv_j and/or the low pass value rate-of-change ΔLPFv_j are combined with other error index values, a relatively large weight may be applied to the low pass value LPFv_j and/or the low pass value rate-of-change ΔLPFv_j.

When the low pass value LPFv_j or the low pass value rate-of-change ΔLPFv_j is used as the error index value qj, it is possible to make small the threshold value used at step S814 of FIG. 8.

On the contrary, when the time of vehicle stop is long and the data items are acquired from ten or more samples, one of the average Vave_j, the variance σv_j$^2$, and the standard deviation σv_j may be used, and a relatively large weight may be applied thereto.

TABLE 2

| Error Index Value | Features |
|---|---|
| Average of Vehicle Speeds | Offset caused by the ionosphere is measurable. Relatively large number of data items (e.g., 10 samples or more) is needed. |
| Variance of Errors of Vehicle Speeds (Standard Deviation) | Accuracy (reliability) of satellite signal can be estimated. Relatively large number of data items (e.g., 10 samples or more) is needed. |
| Low Pass Value | Definition in the latest state is possible. Sampling number may be small. |
| Change Rate of Low Pass Value | Definition in the latest state is possible. Trend in the new future can be estimated. Sampling number may be small. |

Anyway, it is preferred to use the same error index value qj for each GPS satellite 10*j* in common. This is because it is necessary that the error index value qj for each GPS satellite 10*j* be relatively estimated under the same conditions.

At step S818, the positioning computation processing is performed. The details of this processing will be later explained with reference to FIG. 9 or FIG. 10.

At step S820, it is determined whether the state of the vehicle 90 is changed from the moving state to the stop state, based on the judgment result from the vehicle stop judgment part 40.

When the state of the vehicle 90 is changed from the moving state to the stop state, the control is returned to step S800. On the other hand, when the vehicle 90 is still in the moving state, the control progresses to step S818. Namely, the positioning computation processing of step S818 is continuously performed during movement of the vehicle 90 based on the pseudo distance ρj and the satellite position (Xj, Yj, Zj), etc. which are observed at any time during movement.

Figure 9:
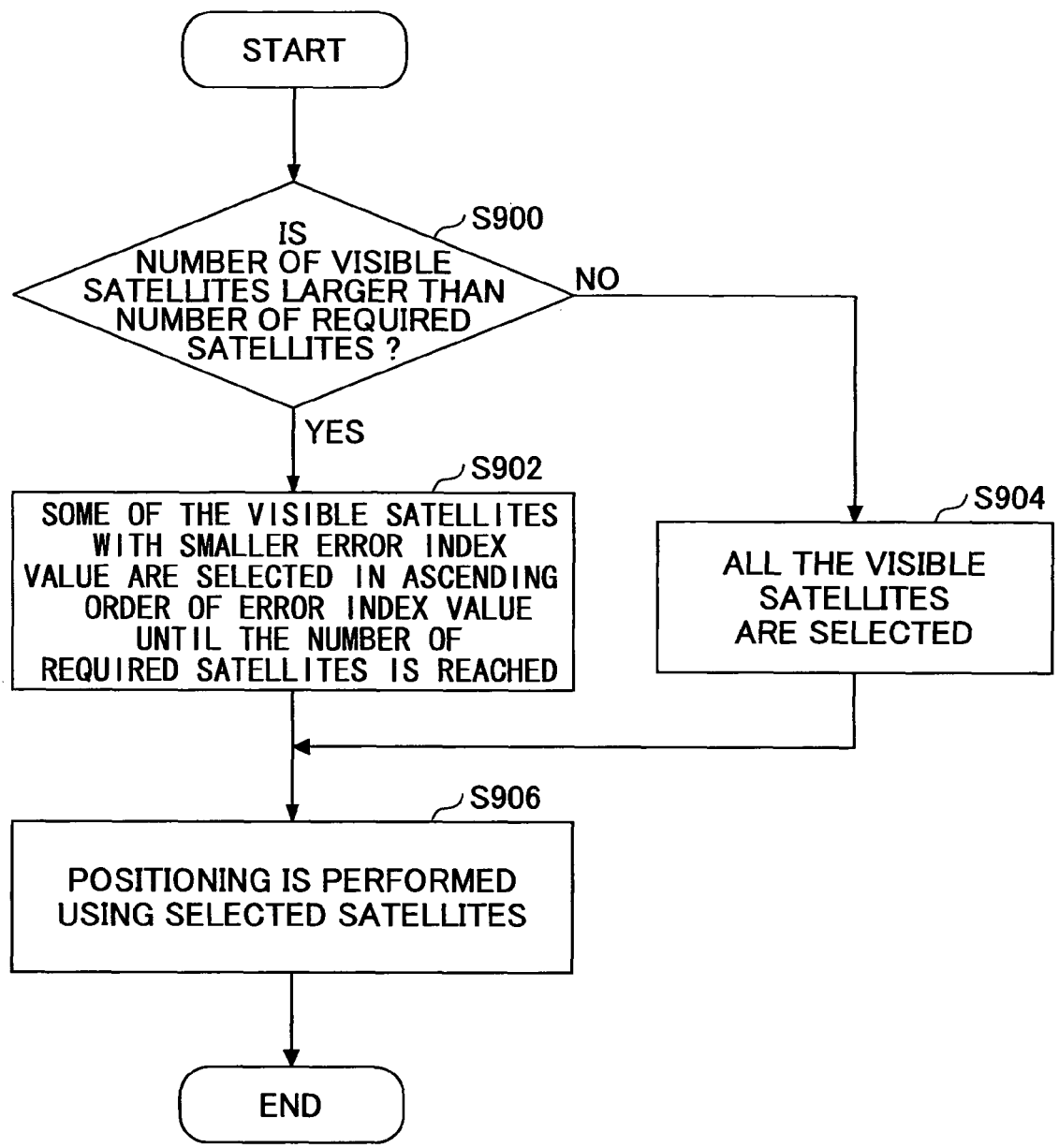
FIG. 9 is a flowchart for explaining a positioning data processing (step S818) in the positioning processing of FIG. 8.

FIG. 9 is a flowchart for explaining a positioning computation processing (step S818) of FIG. 8.

At step S900, it is determined whether the number of GPS satellites 10*j* currently observed is larger than the number of satellites required for positioning (the number of visible satellites).

The number of satellites required for positioning is a number which should be determined according to a positioning method. For example, the number may be set to 3. For example, in a case of a positioning method in which a clock error is excluded, the number may be set to 4 or more.

When the number of visible satellites is larger than the number of the required satellites, the control progresses to step S902. When the number of visible satellites is not larger than the number of the required satellites, the control progresses to step S904.

At step S902, some GPS satellites 10*k* used for positioning are selected from among the currently observed GPS satellites 10*j* by the satellite selecting part 58, based on the error index value qj of every GPS satellite 10*j* which was computed at step S816 of FIG. 8.

At this time, the satellite selecting part 58 preferentially selects the GPS satellite 10*j* having a small absolute value of the error index value qj. For example, when the number of required satellites is 4, the satellite selecting part 58 selects four GPS satellites 10*j* arrayed from the smallest absolute value of the error index value qj in ascending order of the absolute value of the error index value qj as the GPS satellites 10*k* used for positioning. In other words, the satellite selecting part 58 omits the GPS satellite 10*j* having larger absolute value of the error index value qj in descending order of the error index value qj until the number of required satellites is reached.

At step S904, all of the currently observed GPS satellites 10*j* are selected as the GPS satellite 10*k* used for positioning by the satellite selecting part 58.

At step S906, positioning of the current position (Xu(i), Yu(i), Zu(i)) of the vehicle 90 is performed by the positioning computation part 59, based on the pseudo distances ρk of GPS satellites 10*k* selected at the above step S902 or S904, from among the pseudo distances ρj(i) of the respective GPS satellites 10*j* inputted from the filter 130 for the current period, and the satellite positions (Xk(i), Yk(i), Zk(i)) of the respective GPS satellites 10*k*. The positioning of the current position of the vehicle 90 may be performed by the following equation using the least square method, etc.

$$\rho_k = \sqrt{(X_k - X_u)^2 + (Y_k - Y_u)^2 + (Z_k - Z_u)^2} + c \cdot \Delta T \qquad \text{Equation 31}$$

where c·ΔT denotes the clock error in the GPS receiver 20. In this case, when the number of the GPS satellites selected is 4, four items of the equation 31 for the GPS satellites 10*k* are obtained, and the positioning of the current position of the vehicle 90 in which the clock error c·ΔT is eliminated is carried out.

At this time, the error index values qk of the above-mentioned selected GPS satellites 10*k* may be used for the diagonal components of the weight matrix, and the weighted positioning computation may be performed.

At the above step S906, positioning of the current vehicle speed v=(vu(i), vu(i), vu(i)) of the vehicle 90 may be performed by the positioning computation part 59, based on the Doppler ranges dρk of the GPS satellites 10*k* selected at the above step S902 or S904, from among the pseudo distances ρj(i) of the respective GPS satellites 10*j* inputted from the filter 130 for the current period, and the satellite moving speed vector Vk=(Vk, Vk, Vk) of the GPS satellites 10*k*. For example, the positioning of the speed of the vehicle 90 may be performed by the following equation using the least square method.

$$\dot{\rho}_k = \dot{r}_k + \dot{b} + \dot{I} + \dot{T} \quad \text{Equation 32}$$
$$= (V_k - v) \cdot l_k + \dot{b} + \varepsilon$$

In the above equation, the black dot affixed to the top of the character denotes a dot (time differential). For example, the time differential of the Doppler range dρk is indicated as ρk dot (time differential).

Since I dot and T dot the amount of change of ionospheric errors and the amount of change of troposphere errors and they are very small, they are indicated as white-noise ε. b dot denotes a differential value of a clock error. The portion of Vk·lk of (Vk−v)·lk is an inner product of the unit vector lk(i) for the period (i) and the satellite moving speed vector Vk. The satellite moving speed vector Vk may be computed by the satellite position computing part 124, based on the satellite orbit information of the navigation message, and the unit vector lk(i) may be computed by the following equation using the positioning result (Xu, Yu, Zu) of the position of the vehicle 90 computed for the period (i) by the positioning computation part 59.

$$l_j = \frac{1}{r_j}(i) \cdot (X_j(i) - X_u, Y_j(i) - Y_u, Z_j(i) - Z_u) \quad \text{Equation 33}$$
$$r_j(i) = \sqrt{(X_j(i) - X_u)^2 + (Y_j(i) - Y_u)^2 + (Z_j(i) - Z_u)^2}$$

In the case of the positioning of the speed of the vehicle 90, the error index values qk of the above-mentioned selected GPS satellites 10k are used for the diagonal components of the weight matrix, and the weighted positioning computation may be performed.

FIG. 10 is a flowchart for explaining another positioning data processing (step S818) of FIG. 8.

At step S1000, the GPS satellites 10k whose absolute value of the error index value qj is below a predetermined value are selected from among the currently observed GPS satellites 10j by the satellite selecting part 58, based on the error index value qj which was computed for every GPS satellite 10j at the above step S816 of FIG. 8.

At step S1002, it is determined whether the number of the GPS satellites 10k selected at the above step S1000 is larger than the number of satellites required for positioning. For example, the number of satellites required for positioning may be set to 3. In the case of a positioning method in which a clock error is eliminated, the number may be set to 4 or more.

When the number of the selected GPS satellites 10k is larger than the number of required satellites, the control progresses to step S1004. On the other hand, when the number of the selected GPS satellites 10k is not larger than the number of required satellites, the control progresses to step S1006.

At step S1004, positioning of the current position and the speed of the vehicle 90 is performed by the positioning computation part 59, based on the observation data of all of the GPS satellites 10k selected at the above step S1000. The positioning method may be the same as that of step S906 of FIG. 9. When the number of the selected GPS satellites 10k is 5 or more, it may be computed from the position and speed of the vehicle 90 which can be determined as the positioning results having the most probable final position and speed.

At step S1006, positioning is performed by the positioning computation part 59 in accordance with the inertial navigation method using an INS sensor etc.

According to the mobile-unit positioning device of the above-mentioned embodiment, the vehicle speed Vu_j of every GPS satellite 10j is computed based on the observational data of each GPS satellite 10j when the vehicle 90 is in a stop state. And the error index value qj between the respective GPS satellites 10j can be estimated relatively and the magnitude of the error factor included in the observational data of each GPS satellite 10j can be compared between the GPS satellites 10j with good precision.

As mentioned above, the present invention is not limited to the above-described embodiments and various variations and modifications may be made without deviating from the scope of the present invention.

For example, in the above-mentioned embodiments, the vehicle speed computing part 52 may compute the absolute value of vehicle speed Vu_j. In this case, the error index value computing part 56 may compute the above-mentioned error index value qj based on the absolute value of vehicle speed Vu_j.

In the above-mentioned embodiments, the vehicle speed computing part 52 may use any of the three kinds of computation methods of vehicle speed Vu_j mentioned above properly for every GPS satellite 10j.

For example, with respect to the GPS satellite 10j in a position which is easily influenced by the ionized layer due to the GIM etc., the computation method of the equation 22 which cannot be easily influenced by the ionized layer may be adopted, and a large weight may be applied to the computation value of the equation 22.

Similarly, in the above-mentioned embodiments, the error index value computing part 56 may use any of the plurality of kinds of computation methods of the error index value qj mentioned above properly for every GPS satellite 10j.

In the above-mentioned embodiments, the pseudo distance ρ is computed using the C/A code. Alternatively, the pseudo distance ρ may be measured based on another pseudo noise code, such as a P code of L2 wave. Since it is enciphered in W code in the case of the P code, the P code may be obtained when performing the P-code synchronization, by using a DLL using a cross-correlation system.

The pseudo distance ρ based on the P code can be determined as ρ'$_P$=M$_P$×30 by measuring that the M$_P$-th bit of the P code is received at the vehicle 90 noting that the P code is the 0th bit in the GPS satellite 10$_1$.

In the above-mentioned embodiments, the example in which the invention is applied to a GPS has been described. However, the invention is also applicable to another GNSS (global navigation satellite system), such as a satellite system other than GPS, Galileo etc.

The present application is based upon and claims the benefit of priority of Japanese patent application No. 2007-045882, filed on Feb. 26, 2007, and Japanese patent application No. 2007-094610, filed on Mar. 30, 2007, the contents of which are incorporated by reference in their entirety.

The invention claimed is:

1. A mobile-unit positioning device in which phases of pseudo noise codes carried on satellite signals from a plurality of satellites are observed at a mobile unit to measure a position of the mobile unit, comprising:
  a pseudo-distance measuring part measuring a pseudo distance for every satellite between one of the plurality of satellites and the mobile unit during a stop of the mobile unit using an observed value of the pseudo noise code phase acquired during a stop of the mobile unit;

an error-index-value computing part computing an error index value for every satellite indicating an error of the measured pseudo distance, based on the pseudo distances measured by the pseudo-distance measuring part at a plurality of points in time during a stop of the mobile unit;

a weighting-factor determining part determining a weighting factor for every satellite based on the error index value for every satellite computed by the error-index-value computing part; and a positioning computation part performing a weighted positioning computation using the weighting factor for every satellite determined by the weighting-factor determining part, to determine a position of the mobile unit during movement using an observed value of the pseudo noise code phase acquired during movement of the mobile unit.

2. The mobile-unit positioning device according to claim 1, wherein the error index value is either a variance or a standard deviation.

3. The mobile-unit positioning device according to claim 1, further comprising an error averaging part computing an average of errors of measured pseudo distances for every satellite based on the pseudo distances measured by the pseudo-distance measuring part at a plurality of points in time during a stop of the mobile unit, wherein the positioning computation part determines a position of the mobile unit during movement using the observed value of the phase which is corrected by the error average computed by the error averaging part.

4. A mobile-unit positioning device in which Doppler frequencies of carriers of satellite signals from a plurality of satellites are observed at a mobile unit to measure a speed of the mobile unit, comprising:

a mobile-unit-speed computing part computing a speed of the mobile unit for every satellite during a stop of the mobile unit using an observed value of a Doppler frequency acquired during a stop of the mobile unit;

an error-index-value computing part computing an error index value for every satellite indicating an error of the computed mobile unit speed, based on the mobile unit speeds computed by the mobile-unit-speed computing part at a plurality of points in time during a stop of the mobile unit;

a weighting-factor determining part determining a weighting factor for every satellite based on the error index value for every satellite computed by the error-index-value computing part; and a positioning computation part performing a weighted positioning computation using the weighting factor for every satellite determined by the weighting-factor determining part, to determine a speed of the mobile unit during movement using an observed value of the Doppler frequency acquired during movement of the mobile unit.

5. The mobile-unit positioning device according to claim 4, wherein the error index value is either a variance or a standard deviation.

6. The mobile-unit positioning device according to claim 4, further comprising a satellite selecting part selecting one of the plurality of satellites that is used for the weighted positioning computation, based on mobile unit speed for every satellite computed by the mobile-unit-speed computing part.

7. The mobile-unit positioning device according to claim 6, further comprising a mobile-unit stop determining part determining whether the mobile unit is in a stop state, based on an output signal of a sensor arranged in the mobile unit, wherein the satellite selecting part selects one of the plurality of satellites used for the weighted positioning computation, in accordance with the error index value for every satellite computed by the error-index-value computing part.

8. The mobile-unit positioning device according to claim 7, wherein the satellite selecting part preferentially selects a satellite having a small error index value computed by the error index value computing part.

9. The mobile-unit positioning device according to claim 7, wherein the error index value is any of an average of the mobile unit speeds computed by the mobile-unit-speed computing part at a plurality of points in time during a stop of the mobile unit determined by the mobile-unit stop determining part, a variance of errors of the computed mobile unit speeds, a standard deviation of errors of the computed mobile unit speeds, a low pass value obtained from the computed mobile unit speeds applied to a low pass filter, and a rate of change of the low pass value solely or in combination thereof.

10. A mobile-unit positioning method in which phases of pseudo noise codes carried on satellite signals from a plurality of satellites are observed at a mobile unit to measure a position of the mobile unit, comprising the steps of:

measuring a pseudo distance for every satellite between one of the plurality of satellites and the mobile unit during a stop of the mobile unit using an observed value of the pseudo noise code phase acquired during a stop of the mobile unit;

computing an error index value for every satellite indicating an error of the measured pseudo distance, based on the pseudo distances measured in the measuring step at a plurality of points in time during a stop of the mobile unit;

determining a weighting factor for every satellite based on the error index value for every satellite computed in the computing step; and performing a weighted positioning computation using the weighting factor for every satellite determined in the determining step, to determine a position of the mobile unit during movement using an observed value of the pseudo noise code phase acquired during movement of the mobile unit.

* * * * *